(12) United States Patent
Suzuki et al.

(10) Patent No.: US 7,513,493 B2
(45) Date of Patent: Apr. 7, 2009

(54) IMAGE PROCESSING APPARATUS

(75) Inventors: Yoshiaki Suzuki, Kawasaki (JP);
Hideyuki Terashima, Kawasaki (JP);
Takashi Awai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 349 days.

(21) Appl. No.: 11/149,475

(22) Filed: Jun. 9, 2005

(65) Prior Publication Data
US 2005/0285327 A1 Dec. 29, 2005

(30) Foreign Application Priority Data
Jun. 23, 2004 (JP) .............................. 2004-184538

(51) Int. Cl.
*B65H 3/44* (2006.01)
*B65H 5/26* (2006.01)

(52) U.S. Cl. .................... 271/9.07; 271/9.13; 271/9.01; 271/10.13

(58) Field of Classification Search ................. 271/109, 271/226, 9.05, 9.01, 9.07, 9.13, 10.12, 10.13; 399/367; 358/474
See application file for complete search history.

(56) References Cited

U.S. PATENT DOCUMENTS

| | | | | |
|---|---|---|---|---|
| 4,996,604 A | * | 2/1991 | Ogawa et al. ................ 358/474 |
| 5,226,743 A | * | 7/1993 | Jackson et al. ............... 400/625 |
| 5,266,743 A | * | 11/1993 | Helbawi ....................... 174/93 |
| 5,642,952 A | * | 7/1997 | Tomatsu et al. .............. 400/624 |
| 5,651,623 A | | 7/1997 | Stodder |
| 5,672,019 A | * | 9/1997 | Hiramatsu et al. ........... 400/624 |
| 5,727,890 A | * | 3/1998 | Stodder et al. ............... 400/624 |
| 5,738,454 A | | 4/1998 | Zepeda |
| 5,896,206 A | * | 4/1999 | Kellogg ........................ 358/498 |
| 5,946,016 A | * | 8/1999 | Saito et al. ................... 347/104 |
| 5,954,326 A | * | 9/1999 | Gaarder et al. .............. 271/9.02 |
| 6,246,493 B1 | * | 6/2001 | Uchiyama et al. ............ 358/498 |
| 6,404,507 B1 | * | 6/2002 | Hamamoto et al. .......... 358/1.5 |
| 6,722,648 B2 | * | 4/2004 | Tsusaka et al. ................ 271/65 |
| 6,929,414 B2 | * | 8/2005 | Kadomatsu ............... 400/608.2 |
| 7,151,622 B2 | * | 12/2006 | Suzuki et al. ................ 358/498 |

FOREIGN PATENT DOCUMENTS

| | | |
|---|---|---|
| JP | 57-067431 | 4/1982 |
| JP | 3-243545 A | 10/1991 |
| JP | 06-191106 | 7/1994 |
| JP | 7-181763 | 7/1995 |
| JP | 2003-104573 | 4/2003 |

* cited by examiner

*Primary Examiner*—Patrick H Mackey
*Assistant Examiner*—Luis Gonzalez
(74) *Attorney, Agent, or Firm*—Canon USA Inc. IP Div

(57) ABSTRACT

An image processing apparatus includes a document loading unit in which a document sheet is loaded, a recording-sheet loading unit in which a recording sheet is loaded, a supply roller that supplies the document sheet or the recording sheet from the document loading unit or the recording-sheet loading unit, a separator that separates the document sheet or the recording sheet in cooperation with the supply roller, a feeding path through which both the document sheet and the recording sheet pass, a reading unit that reads an image on the document sheet, and a recording unit that records an image on the recording sheet.

11 Claims, 32 Drawing Sheets

FIG. 4A
FIG. 4B
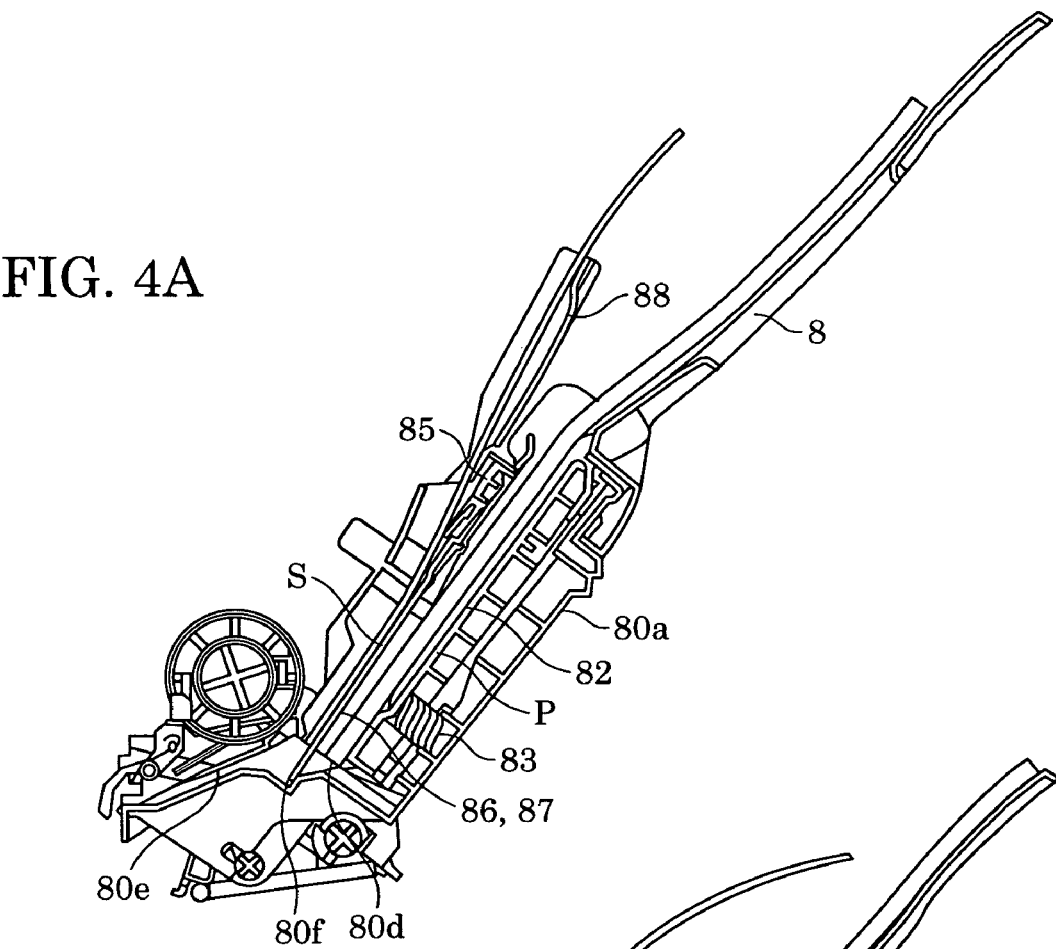
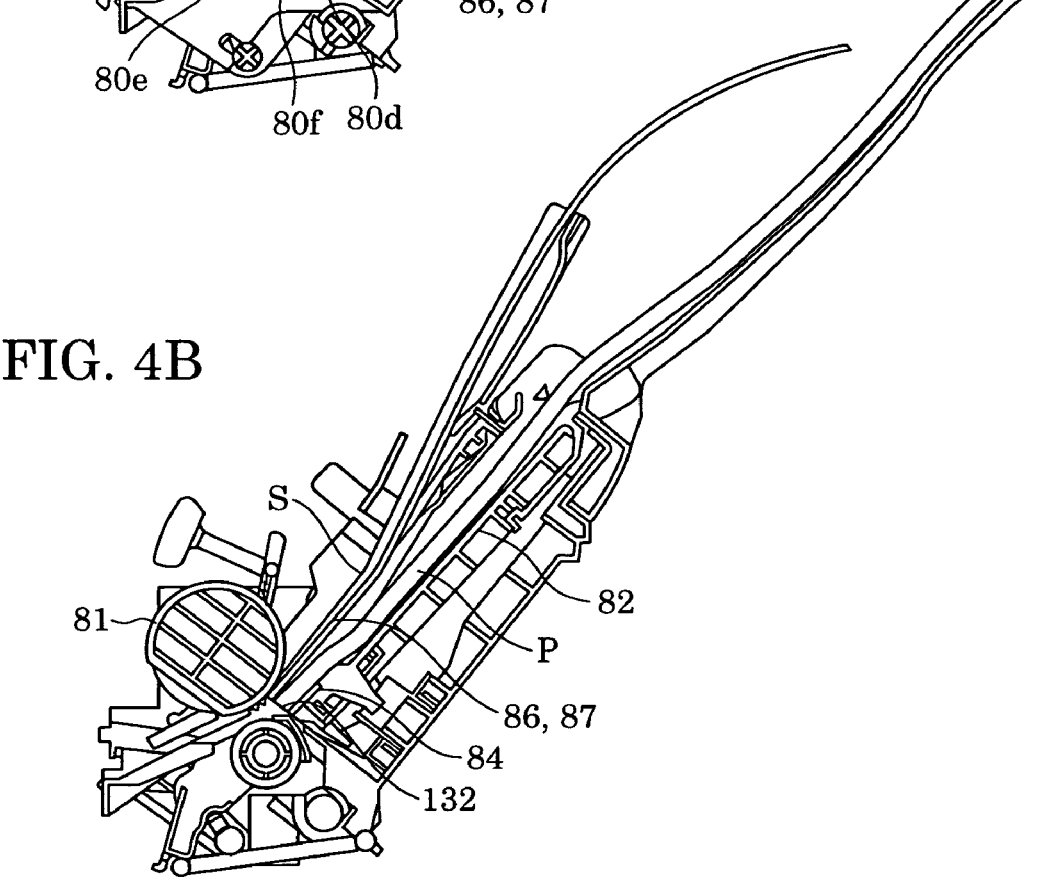

FIG. 18A
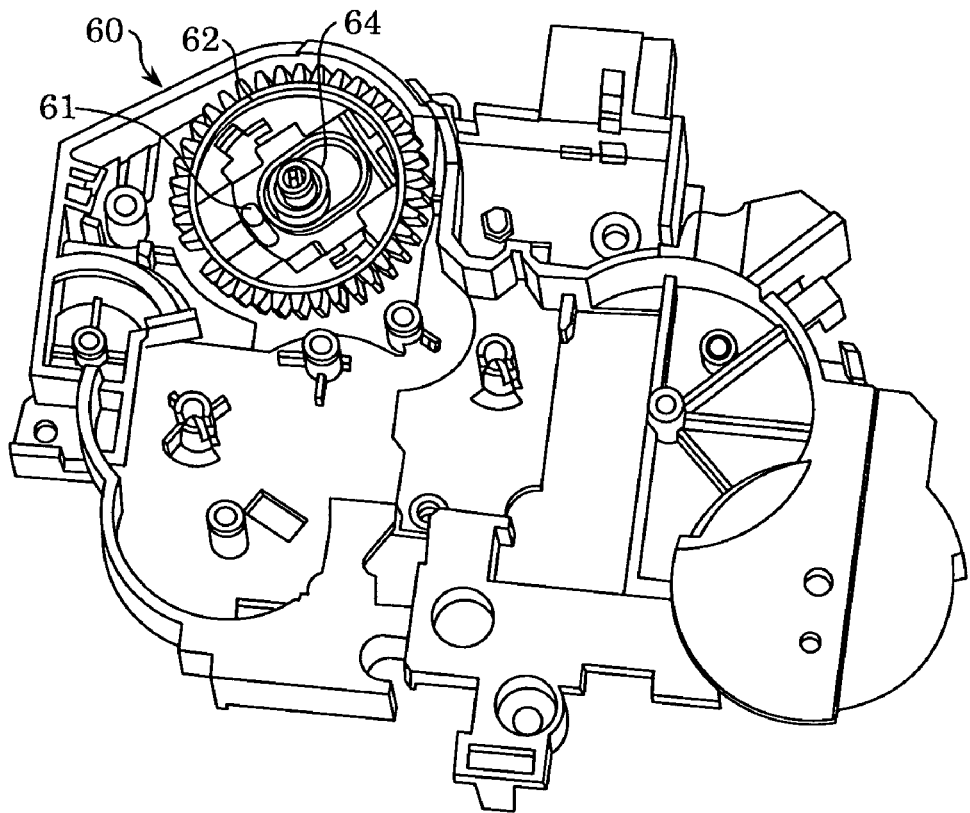
FIG. 18B
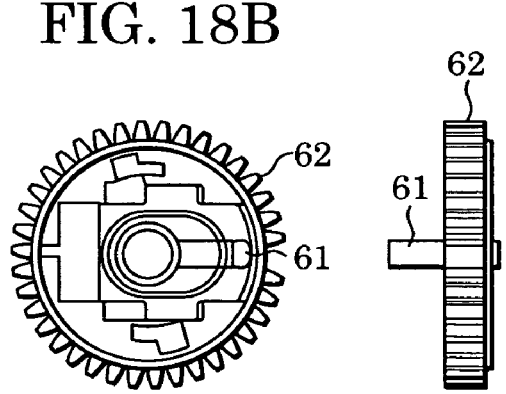
FIG. 18C
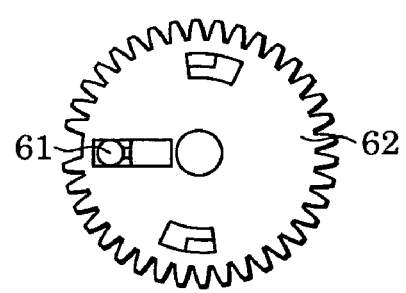
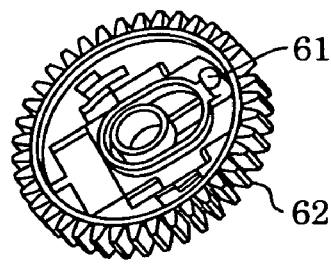

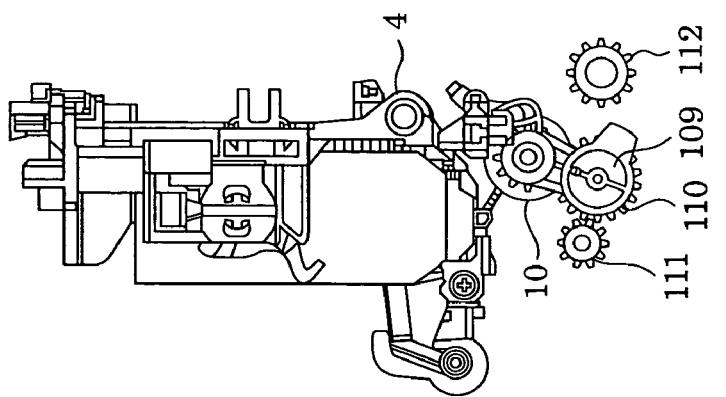
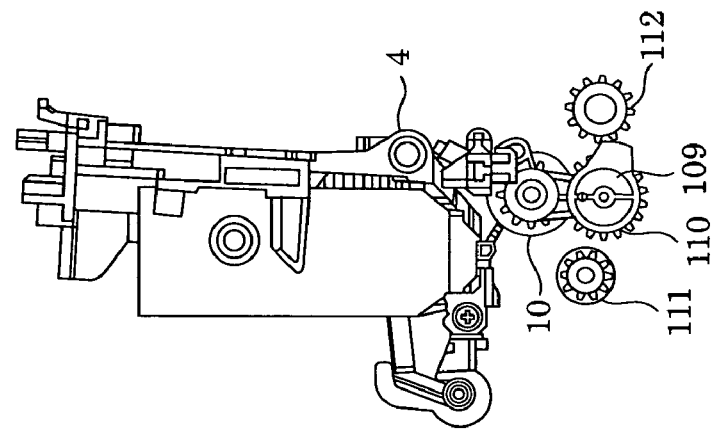
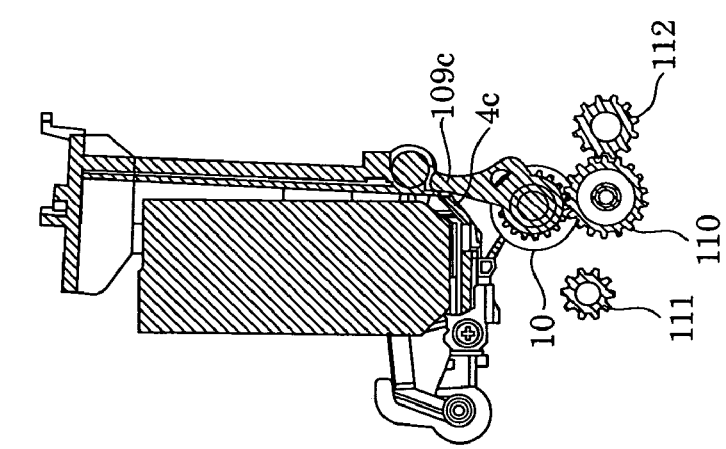
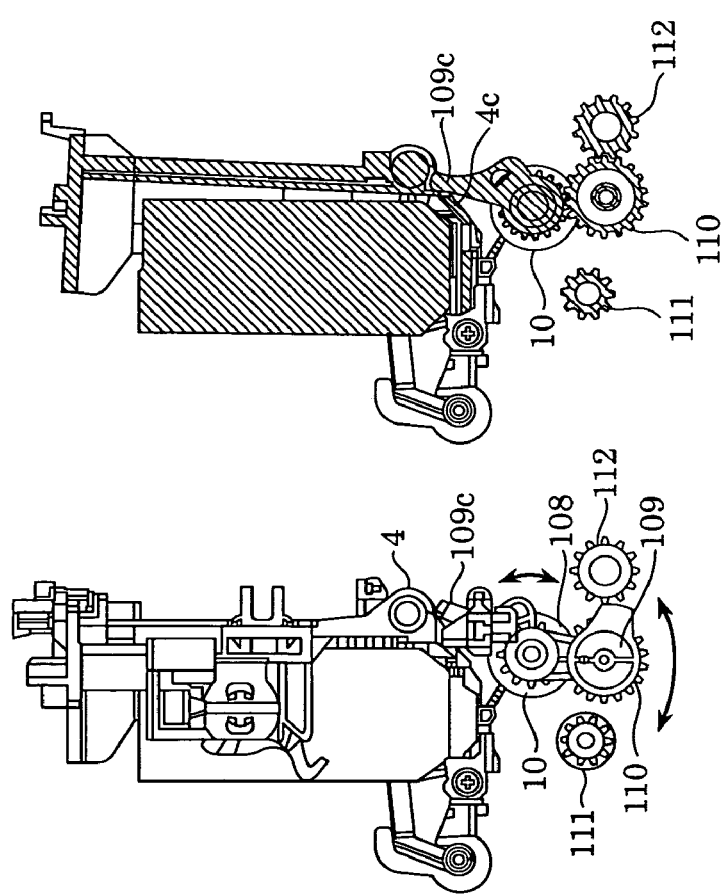

IMAGE PROCESSING APPARATUS

BACKGROUND OF THE INVENTION

1. Field of the Invention

The present invention relates to an image processing apparatus equipped with a sheet feeding device, and more particularly, to an image processing apparatus in which a feeding path is commonly used for both document sheets and recording sheets.

2. Description of the Related Art

Image processing apparatuses, such as facsimile apparatuses, are known in which a part of a feeding path is commonly used for both document sheets and recording sheets for size and cost reduction.

An example of this type of image processing apparatus is disclosed in U.S. Pat. No. 5,727,890, which discloses a facsimile apparatus. FIG. 32 shows the configuration of the facsimile apparatus. The facsimile apparatus includes an ASF (automatic sheet feeding) station 301 that separates and supplies recording sheets stacked on a loading table one by one, an ADF (automatic document feeding) station 302 that separates and supplies stacked document sheets one by one, an auxiliary feeding roller 303 that feeds the recording sheets or the document sheets supplied from the ASF station 301 or the ADF station 302, a main feeding roller 304 that feeds the recording sheets or the document sheets at a predetermined speed, an ejection roller 305 that ejects the document sheets or the recording sheets out of the apparatus, a scanner station 306 that reads data on the document sheets, and a recording station 307 that forms images on the recording sheets. In the above configuration, the auxiliary feeding roller 303, the main feeding roller 304, the ejection roller 305, and a guide member defining the feeding path are commonly used for both the document sheets and the recording sheets in order to reduce the size and cost of the apparatus.

Japanese Patent Laid-Open No. 3-243545 discloses an apparatus in which recording sheets are supplied from a cassette and a manual feeder, serving as recording-sheet loading units, while controlling the rotation of one supply roller. In this case, the supply roller is movable between the loading units to supply sheets from both units.

However, in U.S. Pat. No. 5,727,890, since the scanner station 306 is provided on the upstream side of the main feeding roller 304, the auxiliary feeding roller 303 is provided to convey document sheets to the main feeding roller 304 while compensating for an unstable feeding speed at the ADF station 302. In actuality, only the ejection roller 305 is commonly used, and the size and cost of the apparatus are not sufficiently reduced, as compared with a case in which document sheets and recording sheets are conveyed by different feeding units and through different feeding paths.

In the configuration disclosed in Japanese Patent Laid-Open No. 3-243545, the mechanism for moving the supply roller and control thereof are complicated. In addition, a separation member must be provided for each loading unit. Therefore, the cost and size reduction is insufficient.

SUMMARY OF THE INVENTION

The present invention reduces the size and cost of an image processing apparatus by separating and supplying document sheets and recording sheets by one separation and supply mechanism, and by sharing expensive components, for example, a roller, a separation member, and a sheet guide.

In one aspect of the present invention, an image processing apparatus includes a document loading unit supporting a document sheet, a recording-sheet loading unit supporting a recording sheet, a supply roller that supplies the document sheet from the document loading unit and the recording sheet from the recording-sheet loading unit, a separator that separates one of the document sheet and the recording sheet in cooperation with the supply roller, a feeding path in which both the document sheet and the recording sheet pass, a reading unit that reads an image on the document sheet, and a recording unit that records an image on the recording sheet.

In the image processing apparatus of the present invention including the reading unit and the recording unit, the supply roller, the separator, and the feeding path for separating and feeding document sheets and recording sheets can be commonly used, the size and cost of the apparatus can be reduced. Although these components are commonly used, document sheets and recording sheets are supplied by respective optimum operations. This improves the quality of the apparatus.

Further features and advantages of the present invention will become apparent from the following description of exemplary embodiments with reference to the attached drawings.

BRIEF DESCRIPTION OF THE DRAWINGS

FIGS. 4A and 4B are cross-sectional views showing a state in which document sheets and recording sheets are loaded.

FIGS. 18A, 18B, and 18C are schematic views showing the configuration of the reading driving system.

FIGS. 26A, 26B, 26C, and 26D are side views explaining the motion of a planetary gear in the second drive switching unit.

DESCRIPTION OF THE EMBODIMENTS

An embodiment of the present invention will be described in detail below with reference to the attached drawings. The dimensions, materials, shapes, and relative positions of components described in this embodiment are not specifically limited, and the present invention is not limited to the embodiment, unless otherwise stated.

Figure 1:
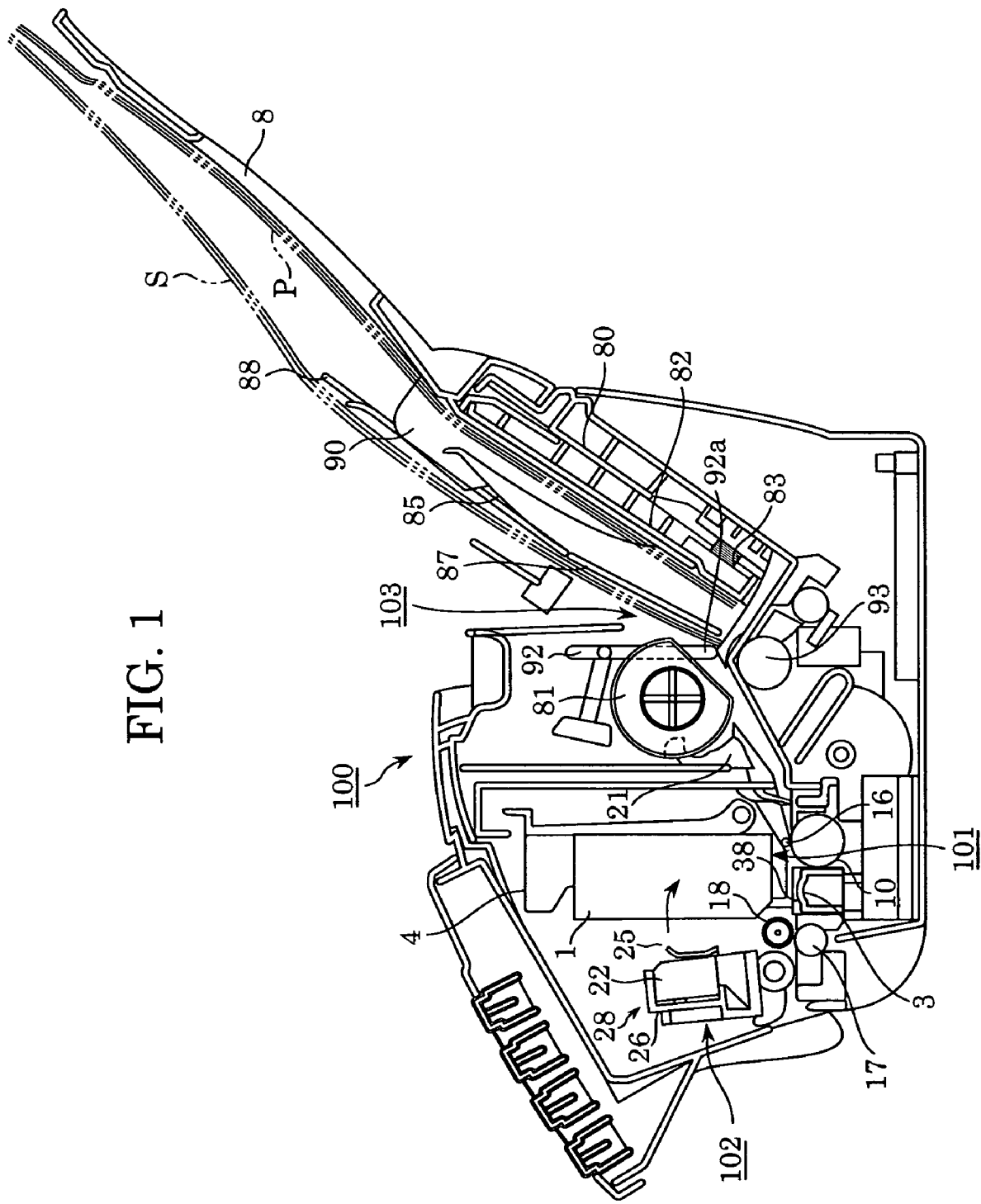
FIG. 1 is a cross-sectional view showing the configuration of an image processing apparatus according to an embodiment of the present invention.

FIG. 1 is a cross-sectional view showing the configuration of a facsimile apparatus serving as an image processing apparatus according to an embodiment of the present invention. In a facsimile apparatus 100 shown in FIG. 1, recording sheets P and document sheets S are loaded. The facsimile apparatus 100 includes an image recording station 101 having a cartridge 1 serving as a recording unit, an image reading station 102 having an image reading unit 28 serving as a reading unit, and an automatic feeding station 103 that separates and feeds a plurality of loaded recording sheets P or document sheets S one by one to the image recording station 101 or the image reading unit 28.

On the downstream side of the automatic feeding station 103, there are provided a PE (page end) sensor lever 21 for detecting a recording sheet P (or a document sheet S), a feeding unit for feeding the sheet at a predetermined speed in the image recording station 101 and the image reading station 102, and an ejection unit for ejecting the sheet out of the apparatus after recording and reading operations. The feeding unit includes a feeding roller 10 composed of a metal shaft and a rubber roller, and a plurality of pinch rollers 16 arranged in the sheet width direction and urged against the feeding roller 10. The ejection unit includes an ejection roller 17 formed by integrally molding a plastic shaft and elastomer, and a spur 18 urged against the ejection roller 17. A platen 3 is provided to define a sheet running surface on which the sheet travels from an ASF base 80 to the ejection roller 17. A recording-sheet support surface of the platen 3 has a plurality of ribs 38 arranged in the width direction of the recording sheet. When being conveyed, a recording sheet P passes over the ribs 38. In this way, the feeding path between a supply roller 81 and the ejection roller 17 is commonly used for both document sheets and recording sheets.

Automatic Feeding Station

The automatic feeding station 103 will now be described with reference to FIGS. 2 to 10.

Figure 2:
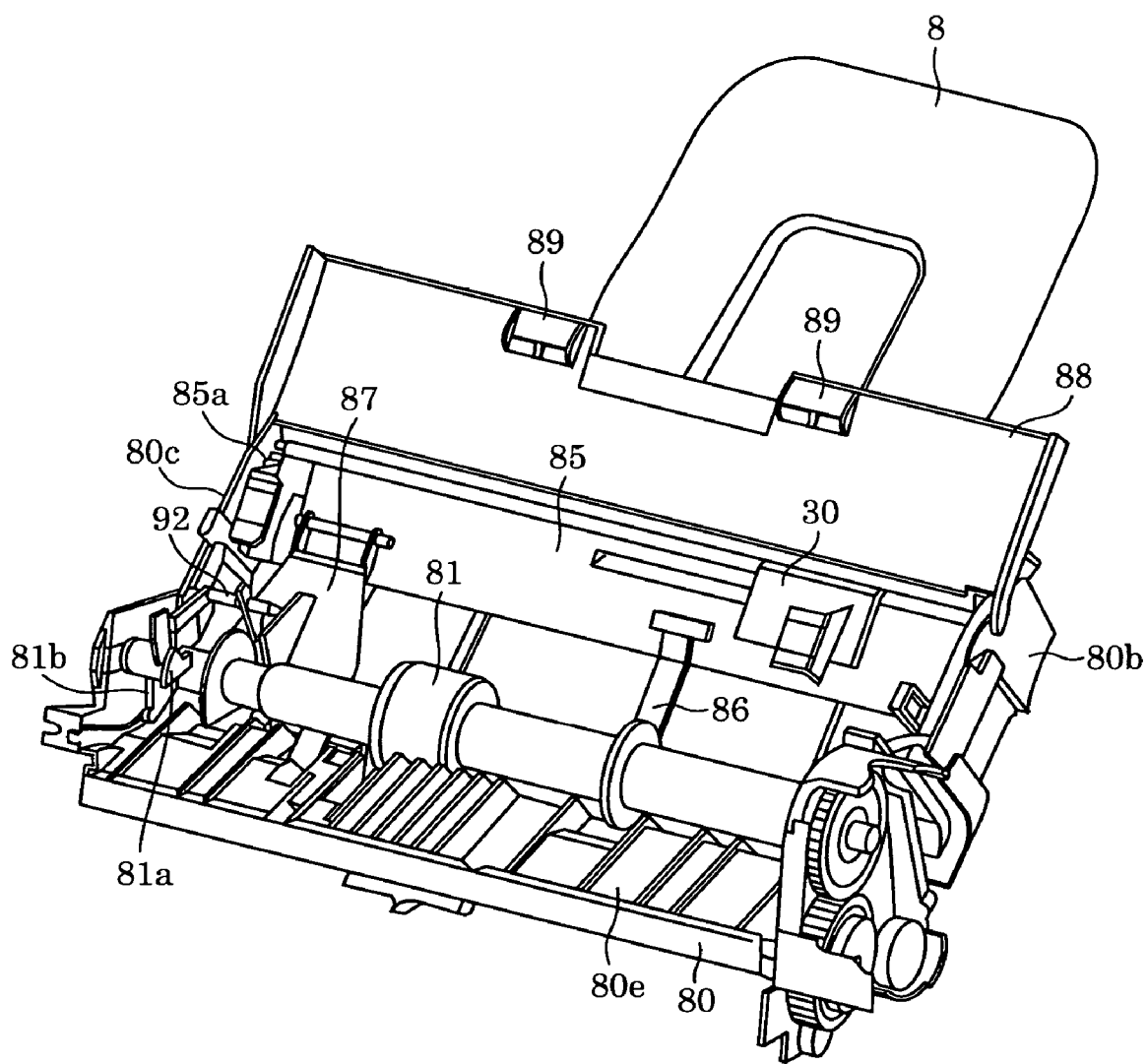
FIG. 2 is a perspective view of an automatic feeding station in which document sheets and recording sheets are not loaded.

As shown in FIGS. 2 and 4A, an ASF base 80 serving as a frame of the automatic feeding station 103 includes a base surface 80a, a right side plate 80b, a left side plate 80c, a leading-edge reference face 80d on which leading edges of loaded document sheets S and recording sheets P abut, and a sheet running surface 80e.

A supply roller 81 and a presser plate 82 are rotatably attached to the right side plate 80b and the left side plate 80c via bearings. The presser plate 82 is biased toward the supply roller 81 by a presser spring 83 disposed between a rear surface of the presser plate 82 and the base surface 80a of the ASF base 80.

Figure 5A:
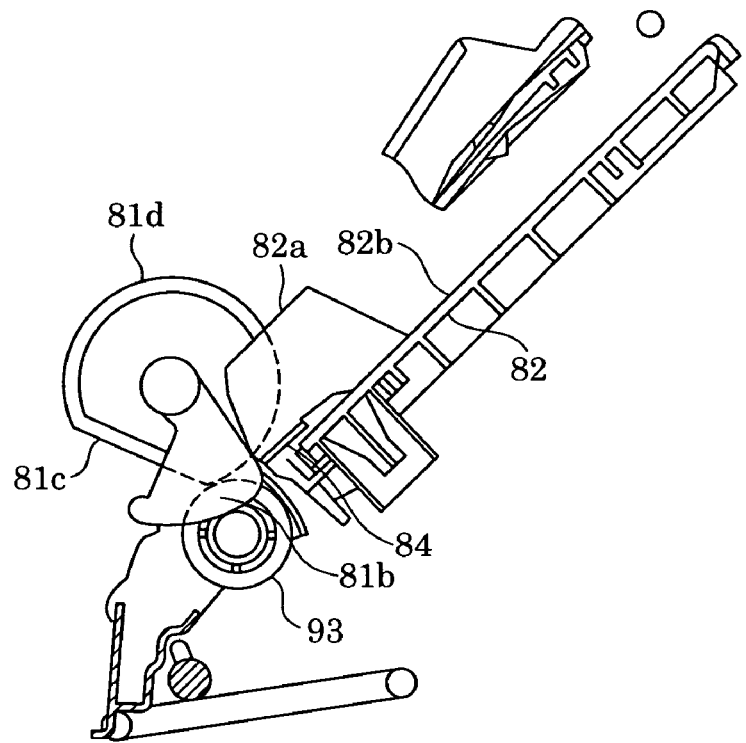
FIGS. 5A and 5B are schematic sectional views showing the motions of a presser plate and a supply roller in the automatic feeding station.
Figure 5B:
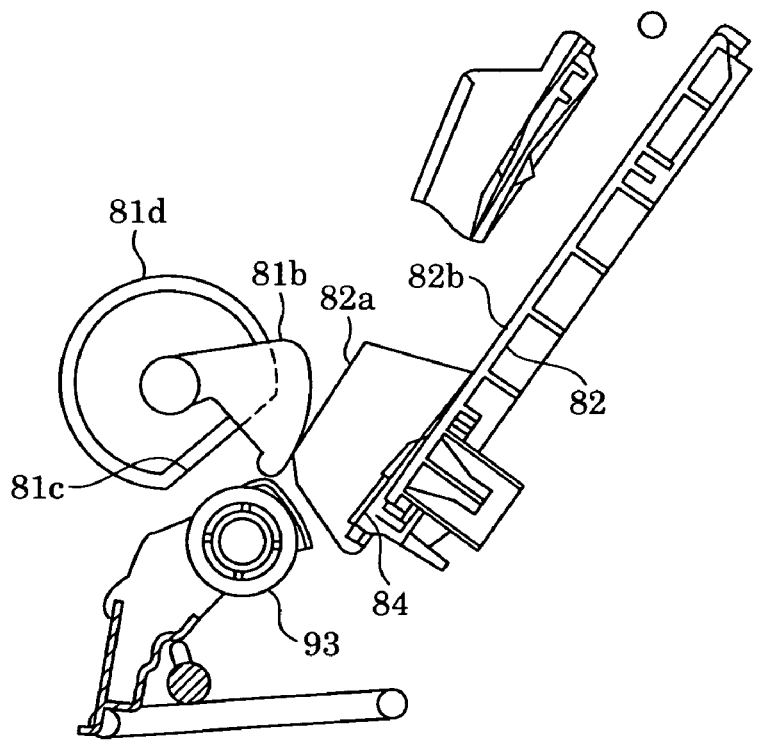

As shown in FIGS. 2 and 5, a driving cam 81b is mounted on a shaft of the supply roller 81, and a driven cam 82a is mounted on the presser plate 82. During a sheet supply operation, the presser plate 82 functions as a pressing member that presses a stack of recording sheets P or document sheets S against the supply roller 81 with the presser spring 83, as shown in FIG. 5A. Except in the sheet supply operation, the presser plate 82 is depressed by the driven cam 82a to function as a recording-sheet loading unit, so that a space in which document sheets and recording sheets are loaded is formed between the presser plate 82 and the supply roller 81, as shown in FIG. 5B. That is, the presser plate 82 is moved into contact with and away from the supply roller 81 by the rotation of the supply roller 81. The driving cam 81b and the driven cam 82a constitute a contact-and-separation unit.

A sensor flag 81a is provided integrally with the shaft of the supply roller 81, and engages with an ASF sensor 718 (FIG. 29) to detect the phase of the supply roller 81. The supply roller 81 is a so-called D-cut roller having an arc-shaped portion 81d and a linear portion 81c in cross section. The phases of the driving cam 81b and the semicircular supply roller 81 are designed so that the linear portion 81c faces a separation pad 84 (as an example of a separator) when the supply roller 81 is separate (FIG. 4A), and so that the arc-shaped portion 81d touches the presser plate 82 when the supply roller 81 is biased (FIG. 4B).

The separation pad 84 is stuck on the leading center of the presser plate 82, and faces the supply roller 81 in a biased state during the sheet supply operation. As shown in FIGS. 5A and 5B, the separation pad 84 slightly protrudes from a recording-sheet loading surface 82b towards the supply roller 81. In this embodiment, the amount of protrusion corresponds to the total thickness of the maximum number of document sheets to be loaded.

A document table 85 (as an example of a document loading unit) is detachably mounted on the presser plate 82 at a predetermined distance from the recording-sheet loading surface 82b. The document table 85 is provided with right and left turnable document bridges 86 and 87. In a state in which the document table 85 is mounted on the presser plate 82, the leading ends of the document bridges 86 and 87 are regulated in a recess 80f of the ASF base 80 so as to be at a predetermined distance from the recording-sheet loading surface 82b of the presser plate 82, as shown in FIG. 4A.

In order to extend the recording-sheet loading surface 82b of the presser plate 82, a recording-sheet tray 8 is attached to the ASF base 80. Similarly, a document tray 88 is fixed to the document table 85 to extend the document loading surface. Nonslip members 89 are provided at the leading end of the document tray 88 (trailing end in the supply direction). The document tray 88 and the document table 85 support about two-thirds the total length of an A4-size sheet. Therefore, when an A4-size sheet is loaded, a one-third rear part of the sheet is free. When the sheet is soft, the rear part hangs down because of its own weight, as shown in FIG. 1, and is supported by the recording-sheet tray 8.

Figure 3:
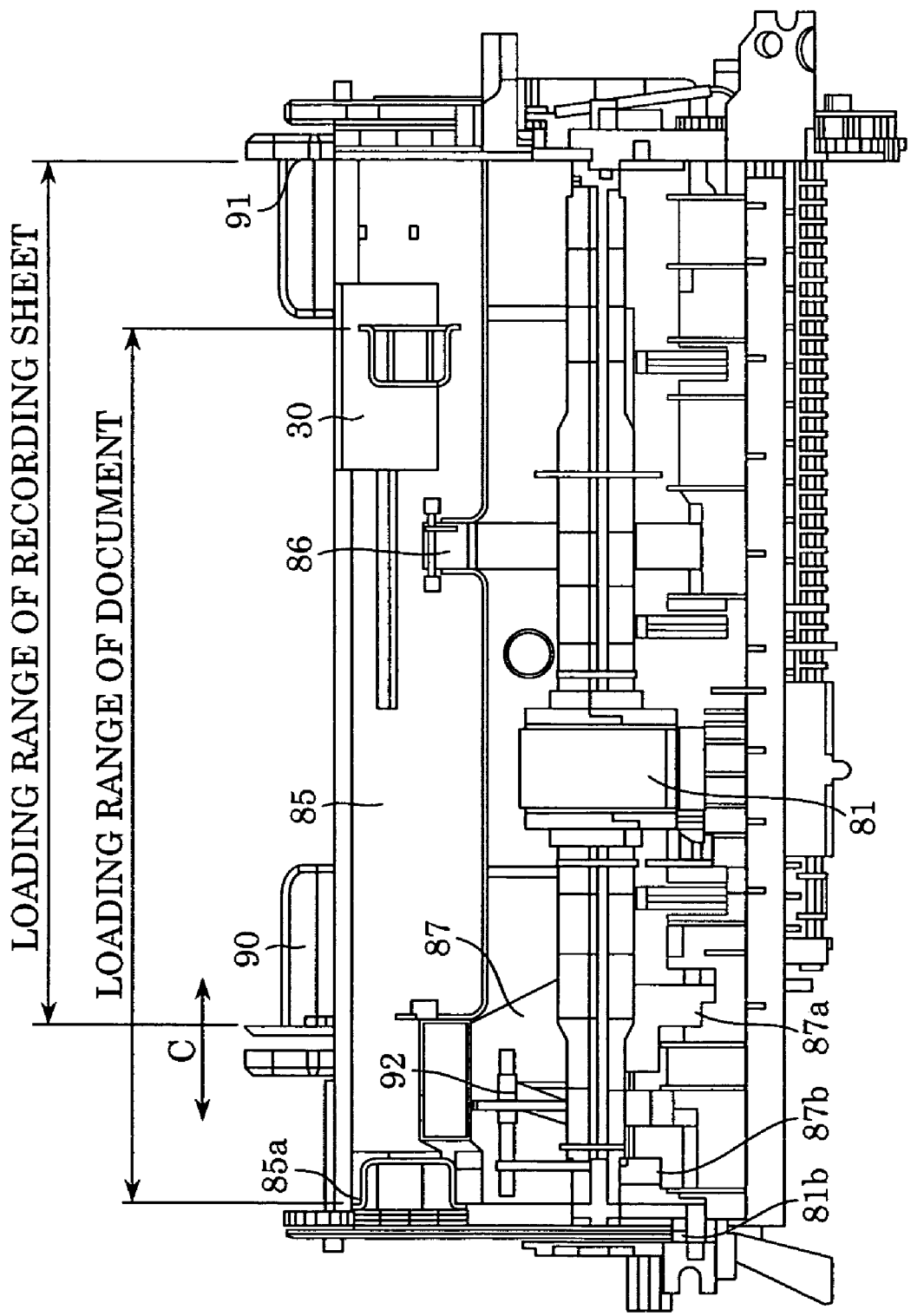
FIG. 3 is a front view of the automatic feeding station in which document sheets and recording sheets are not loaded.

As shown in FIG. 3, the presser plate 82 is provided with a side guide 90 that slides in the direction of arrow C, which is orthogonal to the supply direction in which recording sheets are supplied by the supply roller 81. The document table 85 is provided with a document slider 30 that also slides in the direction of arrow C. When recording sheets are loaded, right sides thereof abut on a recording-sheet lateral reference face 91 of the presser plate 82, left sides are regulated by the side guide 90, leading edges are supported by the leading-edge reference face 80*d*, and the entire recording sheets are supported by the recording-sheet tray 8 and the recording-sheet loading surface 82*b* of the presser plate 82 (FIGS. 1 and 3). In contrast, when document sheets are loaded, left sides thereof abut on a document lateral reference face 85*a* of the document table 85, right sides are regulated by the document slider 30, leading edges are supported by the leading-edge reference face 80*d*, and the entire document sheets are supported by the document tray 88, the document table 85, and the document bridges 86 and 87 (FIGS. 1, 3, and 4).

Figure 29:
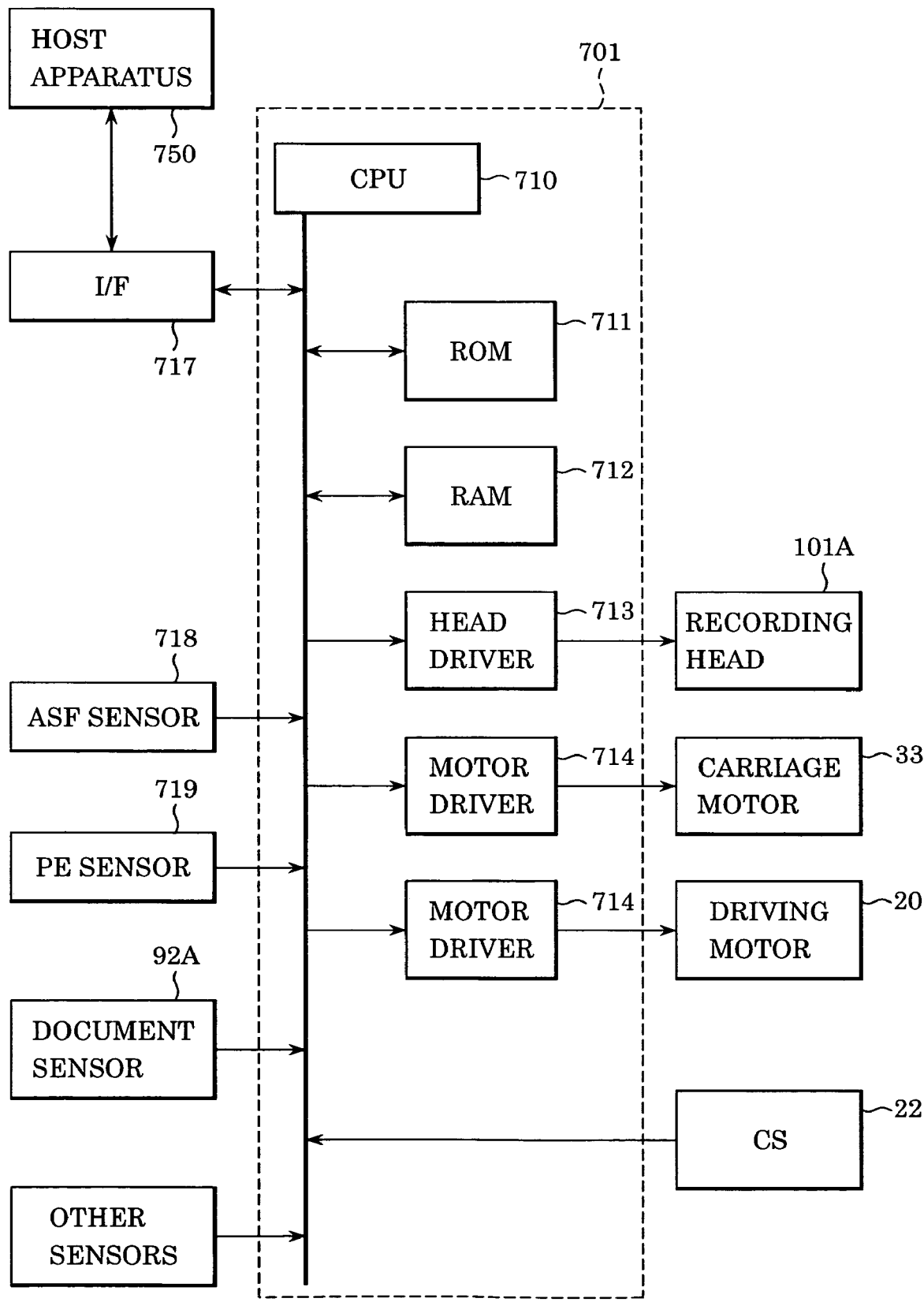
FIG. 29 is a control block diagram of the image processing apparatus.

The recording-sheet lateral reference face 91 and the document lateral reference face 85*a* are respectively provided on the right and left sides of the automatic feeding station 103, and the loading range of recording sheets and the loading range of document sheets are offset from each other by about 30 mm in the widthwise direction of the sheets. Therefore, in a case in which both recording sheets and document sheets are loaded, even when the recording sheets have the largest width, they do not lie under the document sheets within a region of about 30 mm from the document lateral reference face 85*a* (FIG. 3). A sensor for detecting the presence or absence of the documents is provided in this region. The sensor includes a DS actuator 92 turnably supported by a holder (not shown), and a photointerrupter 92A (FIG. 29). When a document is loaded, it touches an arm 92*a* of the DS actuator 92, and turns the DS actuator 92 to turn the photointerrupter 92A on and off (FIG. 1). The leading end of the left document bridge 87 is divided into two parts. One part 87*a* is placed on loaded recording sheets, and the other part does not lie thereon. The arm 92*a* of the DS actuator 92 moves inside a fork of the left document bridge 87 (FIG. 2).

In a case in which only recording sheets are loaded, as shown in FIG. 4A from which document sheets S are removed, when the supply roller 81 rotates, the presser plate 82 is moved by the driving cam 81*b* in a direction such as to be urged against the supply roller 81, and the uppermost recording sheet touches the supply roller 81. In this case, while the document bridges 86 and 87 are placed above the recording sheet, they are disposed outside the supply roller 81 in the widthwise direction and above the supply roller 81, and therefore, do not interfere with separation by the supply roller 81 (FIGS. 2 and 3).

Figure 6A:
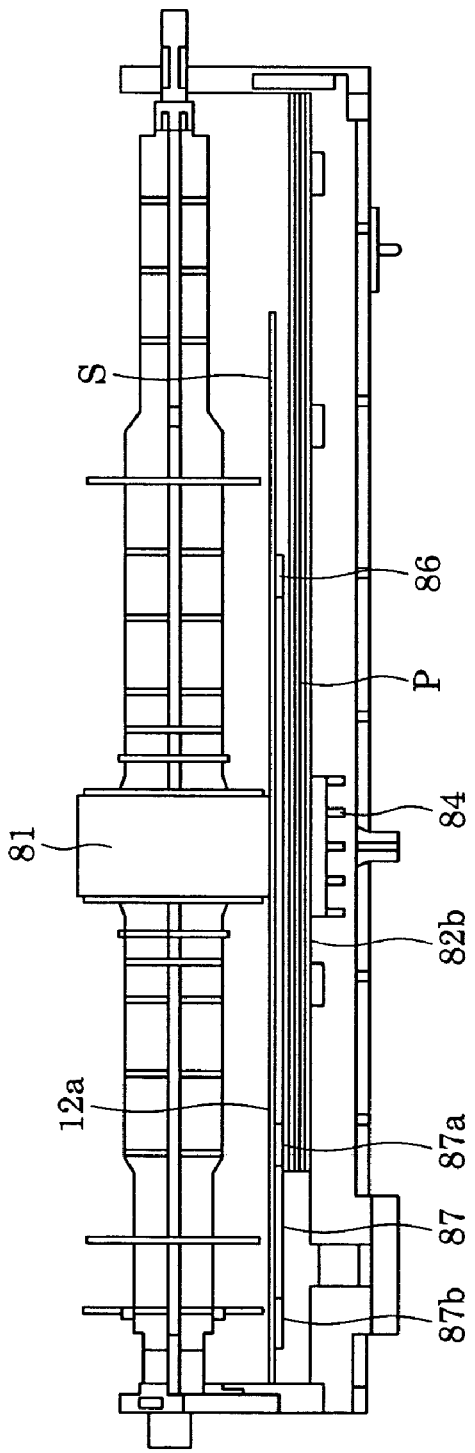
FIGS. 6A and 6B are front views showing a sheet supply state.

FIG. 4A shows a state in which both document sheets S and recording sheets P are loaded. When the supply roller 81 rotates, the presser plate 82 is moved by the driving cam 81*b* in a direction such as to be urged against the supply roller 81 (FIG. 5B), the document sheets S are biased via the recording sheets P, and the uppermost document sheet touches the supply roller 81. In this case, the document bridges 86 and 87 are placed between the recording sheets P and the document sheets S. However, since the separation pad 84 protrudes from the recording-sheet loading surface 82*b*, as shown in FIG. 6A, and the document bridges 86 and 87 are outside the supply roller 81 in the width direction, a predetermined biasing force acts between the document sheet S and the supply roller 81 without excessively deforming the document sheet. While the recording sheets P do not lie under the document sheet S within a region of about 30 mm from the document lateral reference face 85*a*, the document sheet S does not hang down because it is supported by the left document bridge 87. One part of the left document bridge 87 is placed on the loaded recording sheets P to regulate the position, as described above, and the document sheets S can be supported depending on the change of the number of loaded recording sheets P.

Figure 6B:
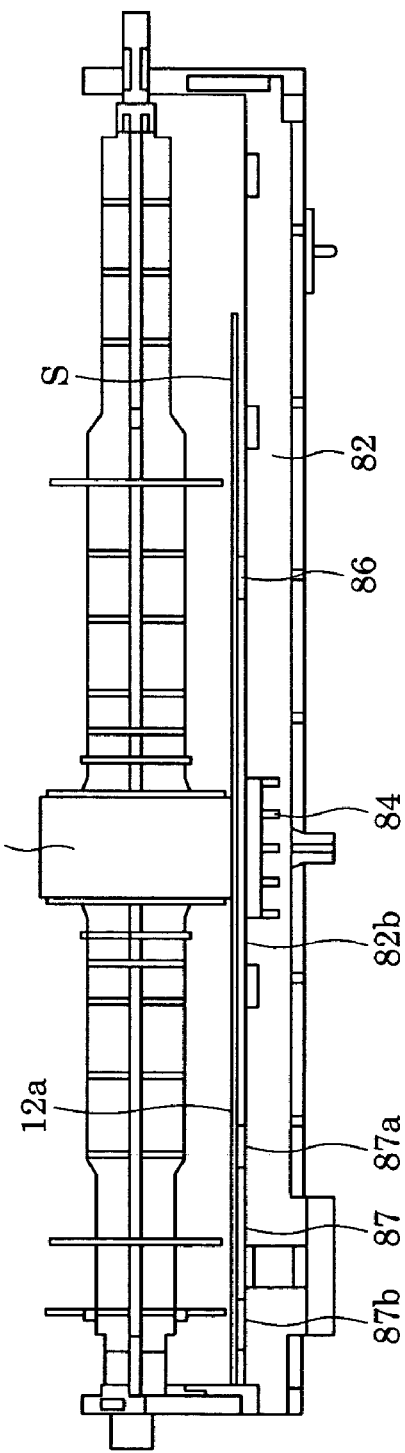

When only document sheets S are loaded, they are directly urged against the presser plate 82, as shown in FIG. 6B, and the uppermost document sheet touches the supply roller 81. While the document bridges 86 and 87 are placed between the presser plate 82 and the document sheet, they are substantially flushed with the separation pad 84 because the separation pad 84 protrudes from the recording-sheet loading surface 82*b*. Consequently, a predetermined urging force acts between the document sheet and the supply roller 81 without undesirably deforming the document sheet. If the separation pad 84 is flush with the recording-sheet loading surface 82*b*, there is a need to deform the document sheet in the width direction by an amount corresponding to the thickness of the document bridges 86 and 87 in order to urge the document sheet against the supply roller 81. In this case, the urging force of the presser plate 82 is used to deform the document sheet, and does not properly act on the supply roller 81. This may cause supply failure.

Figure 7A:
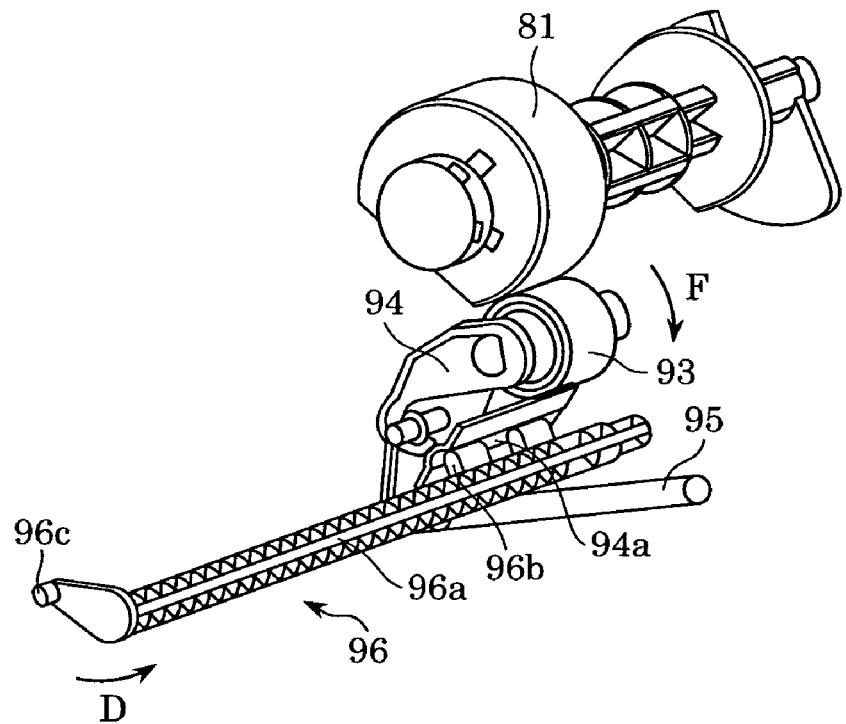
FIGS. 7A and 7B are schematic sectional views explaining a separation mechanism in a separation section.

As shown in FIG. 1, a separation roller 93 is provided as an example of a separator on the downstream side of a nip between the supply roller 81 and the separation pad 84 so as to be in contact with the supply roller 81. As shown in FIG. 7A, the separation roller 93 is supported by a separation-holder 94 with a torque limiter disposed therebetween. The separation-roller holder 94 is pivotally supported on the rear side of the sheet running surface 80*e* of the ASF base 80. The separation roller 93 is urged against the supply roller 81 by a separation-roller spring 95 retained between the separation-roller holder 94 and the ASF base 80 during a sheet supply operation, and is separated from the supply roller 81 by a release cam lever 96 (shown in FIG. 7A) except during the sheet supply operation. The release cam lever 96 includes a shaft 96*a*, a driving cam 96*b*, and a driven cam 96*c* provided on both sides of the shaft 96*a*. The release cam lever 96 is rotatably supported by the rear side of the sheet running surface 80*e* and the left side plate 80*c* of the ASF base 80. The separation-roller holder 94 has a driven surface 94*a* corresponding to the driving cam 96*b*. When the release cam lever 96 rotates a predetermined angle in the direction of arrow D, the driving cam 96*b* presses the driven surface 94*a*, the separation-roller holder 94 pivots in the direction of arrow F, and the separation roller 93 is separated from the supply roller 81 (FIG. 7A). The release cam lever 96 is rotated by the engagement of the driven cam 96*c* with a driving cam of a controller gear 97 that will be described below. The surface of the separation roller 93 is made of, for example, rubber or urethane foam so as to have a coefficient of friction equivalent to that of the supply roller 81.

The relationship among the torque of the torque limiter, the urging force of the separation roller 93, and the coefficients of friction of the supply roller 81 and the separation roller 93 is determined so as to exert the following action. The friction force between the supply roller 81 and the separation roller 93 exceeds the torque of the torque limiter when no document sheet or recording sheet is placed therebetween. Therefore, the rotation of the supply roller 81 is transmitted to the separation roller 93, and the separation roller 93 also rotates. When one document sheet or recording sheet enters between the supply roller 81 and the separation roller 93, the friction force (between the rollers and the sheet) transmitted via the document sheet or recording sheet exceeds the torque of the torque limiter. Therefore, the separation roller 93 rotates, and the sheet is conveyed by the rotation of the supply roller 81. When two or more document sheets or recording sheets enter between the supply roller 81 and the separation roller 93, the friction force (between the sheets) transmitted via the sheets is smaller than the torque of the torque limiter. Therefore, the separation roller 93 stops, only the uppermost sheet is conveyed by the supply roller 81, and the other sheets stop at a nip 98 between the supply roller 81 and the separation roller 93.

Figure 7B:
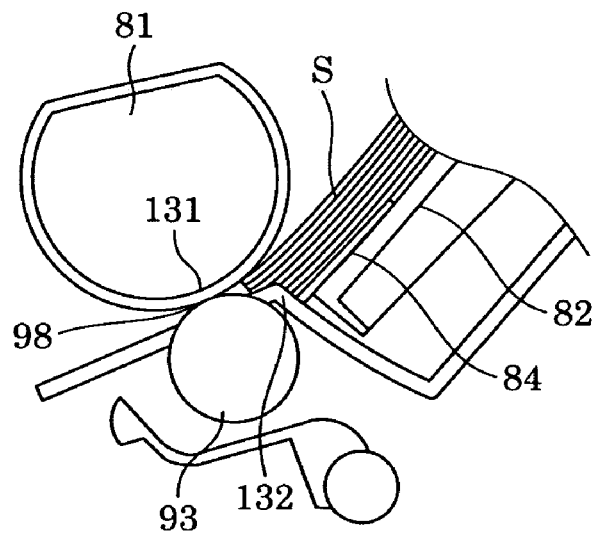

The separation mechanism will now be described in further detail. The automatic feeding station 103 includes two separating units, a preliminary separating unit and a main separating unit 131, as shown in FIG. 7B. The preliminary separation unit includes the separation pad 84 of the presser plate 92, the supply roller 81, and a separation bank 132. The separation bank 132 is provided to form a space of about 1 mm between the supply roller 81 and the sheet running surface 80*e* of the ASF base 80. For example, when fifty recording sheets are loaded, some of them are separated by the separation bank 132, and are conveyed to the main separating unit 131. The main separating unit 131 is defined by the supply roller 81 and the separation roller 93, and separates some sheets that are conveyed by the preliminary separating unit in the above-described operation.

The leading edges of the sheets are aligned when loaded. In contrast, when the sheets are conveyed to the main separating unit 131, the leading edges thereof are slightly offset from one another in the sheet supply direction to form a wedge shape, because of the relationship among the coefficient of friction between the supply roller 81 and the sheets, the coefficient of friction between the sheets, and the coefficient of friction between the sheets and the separation pad 84. Therefore, the sheets can be stably separated at the main separating unit 131. However, when both document sheets and recording sheets are loaded, since a space is provided therebetween, the coefficient of friction at the space is lower than the coefficient of friction between the document sheets or between the recording sheets. In this case, the document sheets form a wedge shape when separated by the preliminary separating unit, and are sometimes conveyed to the main separating unit 131 while the leading edges of all the documents are aligned. Since the document sheets are obliquely placed, the own weight thereof is added to the feeding force of the preliminary separating unit. Consequently, the document sheets abut on and push down the urged separation roller 93, and are not conveyed (FIG. 7B). The frequency of occurrence of this phenomenon increases as the thickness and number of document sheets increases because the weight of the document sheets increases. Accordingly, the above-described nonslip members 89 are provided at the leading end of the document tray 88 so that the document sheets are not conveyed together (see FIG. 2). The nonslip members 89 place a predetermined load on the document sheets so that the document sheets can easily form a wedge shape. The load increases and its effect also increases as the weight of the document sheets increases. Since the load is light when one document sheet is loaded, it does not cause non-supply of the document sheet. In addition, the load has no influence on separation of the recording sheets.

As described above, when a plurality of document sheets and recording sheets are separated and conveyed by the separation roller 93 and the supply roller 81, the second and subsequent sheets stop near the nip 98 between the rollers. When any sheet remains at the nip 98, it needs to be returned to the loading position in order to prevent supply failure from occurring during the next supply operation or when additional sheets are loaded. For the returning operation, a sheet return mechanism is provided.

Figure 8:
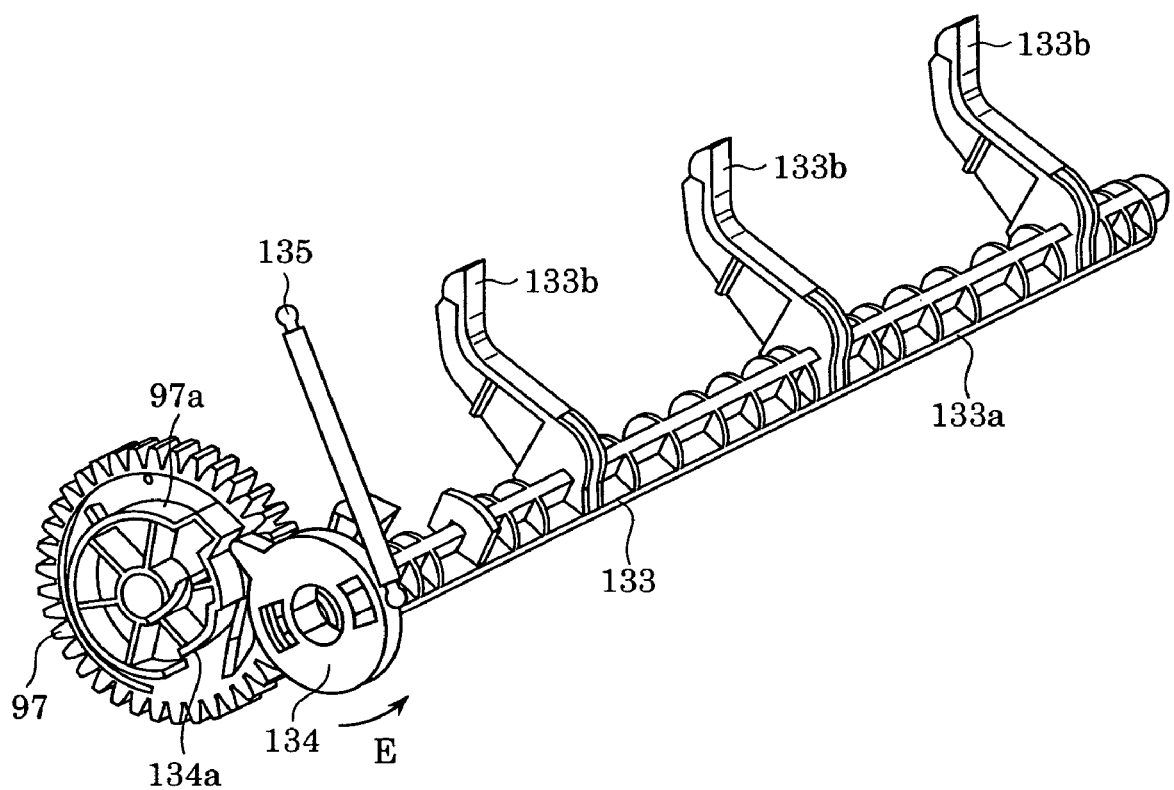
FIG. 8 is a perspective view showing the structure of return claws in the automatic feeding station.

As shown in FIG. 8, the sheet return mechanism includes a return lever 133 turnably supported on the rear side of the sheet running surface 80*e* of the ASF base 80, and a control cam 134 that operates the return lever 133. The return lever 133 includes a shaft 133*a* and a plurality of claws 133*b*. The control cam 134 is mounted at one end of the shaft 133*a*, and is biased by a bias spring 135 in the direction of arrow E. The return lever 133 can be placed at three positions shown in FIGS. 9A, 9B, and 9C by a driven portion 134*a* of the control cam 134 and a driving cam 97*a* of a control gear 97 that will be described later.

Figure 9A:
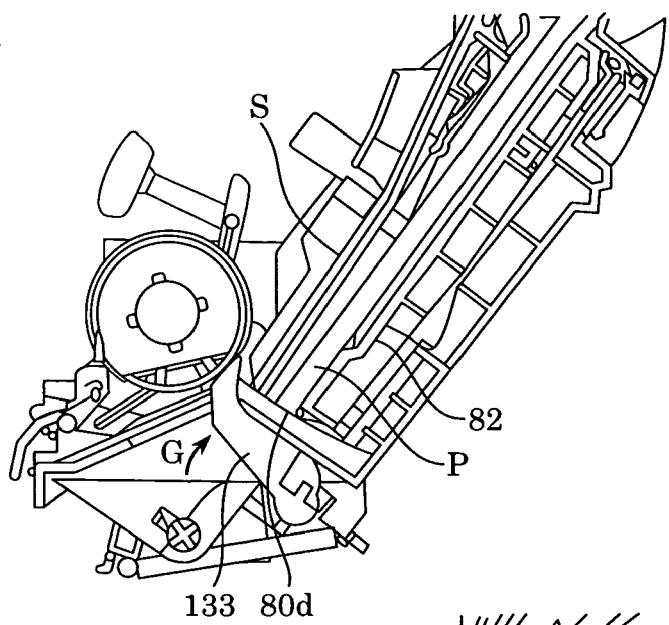
FIGS. 9A, 9B, and 9C are cross-sectional views showing the operation of the return claws in the automatic feeding station.

FIG. 9A shows the position of the return lever 133 in a supply standby state. In this state, the leading end of the return lever 133 is placed in the supply path so as to function as a stopper. This prevents the leading edges of the recording sheets and documents from inadvertently entering deep into the automatic feeding station 103.

Figure 9B:
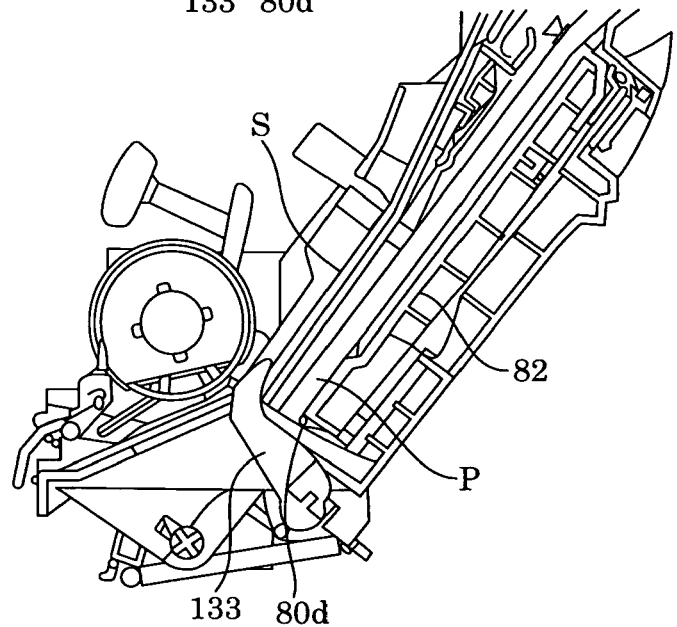

FIG. 9B shows a state in which the return lever 133 is slightly turned in the direction of arrow G from the state shown in FIG. 9A immediately after start of a supply operation and a sheet remaining at the nip is returned to the loading position. Immediately after start of the supply operation, since new recording sheets or document sheets may be loaded during the supply standby state, the leading edges of the sheets are returned to the leading-edge reference face 80*d*. When the return lever 133 is turned to the position shown in FIG. 9B, the leading edge of the preceding recording sheet or document sheet is completely pushed back to the leading-edge reference face 80*d*.

The recording sheet at the nip 98 between the supply roller 81 and the separation roller 93 is returned to the loading position with its leading edge pressed by the motion of the return lever 133. Since the recording sheet is inclined at an angle of about 45° or more, it is returned and lifted in an obliquely upward direction against its own weight. When the stiffness of the recording sheet is low, the recording sheet does not shift upward, and may be curled with only its leading edge returned. Since the assumed thickness of the recording sheet to be used for recording by the apparatus of this embodiment is about 100 μm, the recording sheet is returned to the loading position without being bent. However, when a thin document sheet having a thickness of about 60 μm, such as a slip, is pushed back by the return claws 133*b*, it is sometimes bent, as described above, if a space is provided on the lower side. Accordingly, in this embodiment, the document bridges 86 and 87 form a sheet running surface that regulates the lower space so that even a thin sheet can be returned to the loading position without being bent.

Figure 9C:
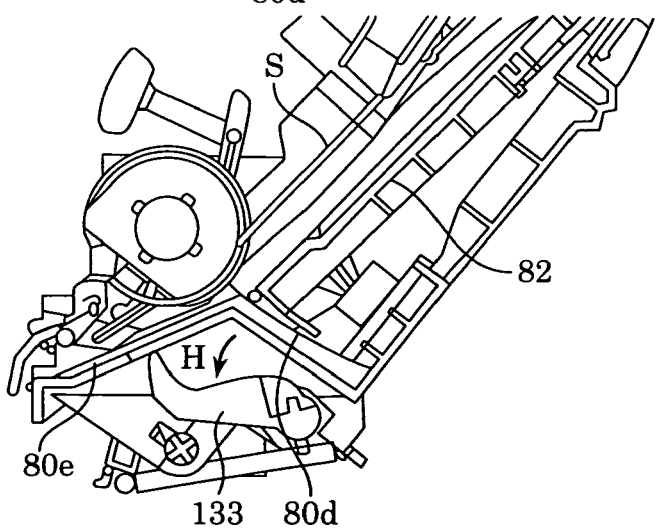

FIG. 9C shows a state in which the driven portion 134*a* of the control cam 134 is separate from the driving cam 97*a* of the control gear 97 (FIG. 8). The return lever 133 is turned in the direction of arrow H by the biasing force of the bias spring 135, and is placed completely outside the sheet running surface so as not to interfere with the sheet.

Figure 10:
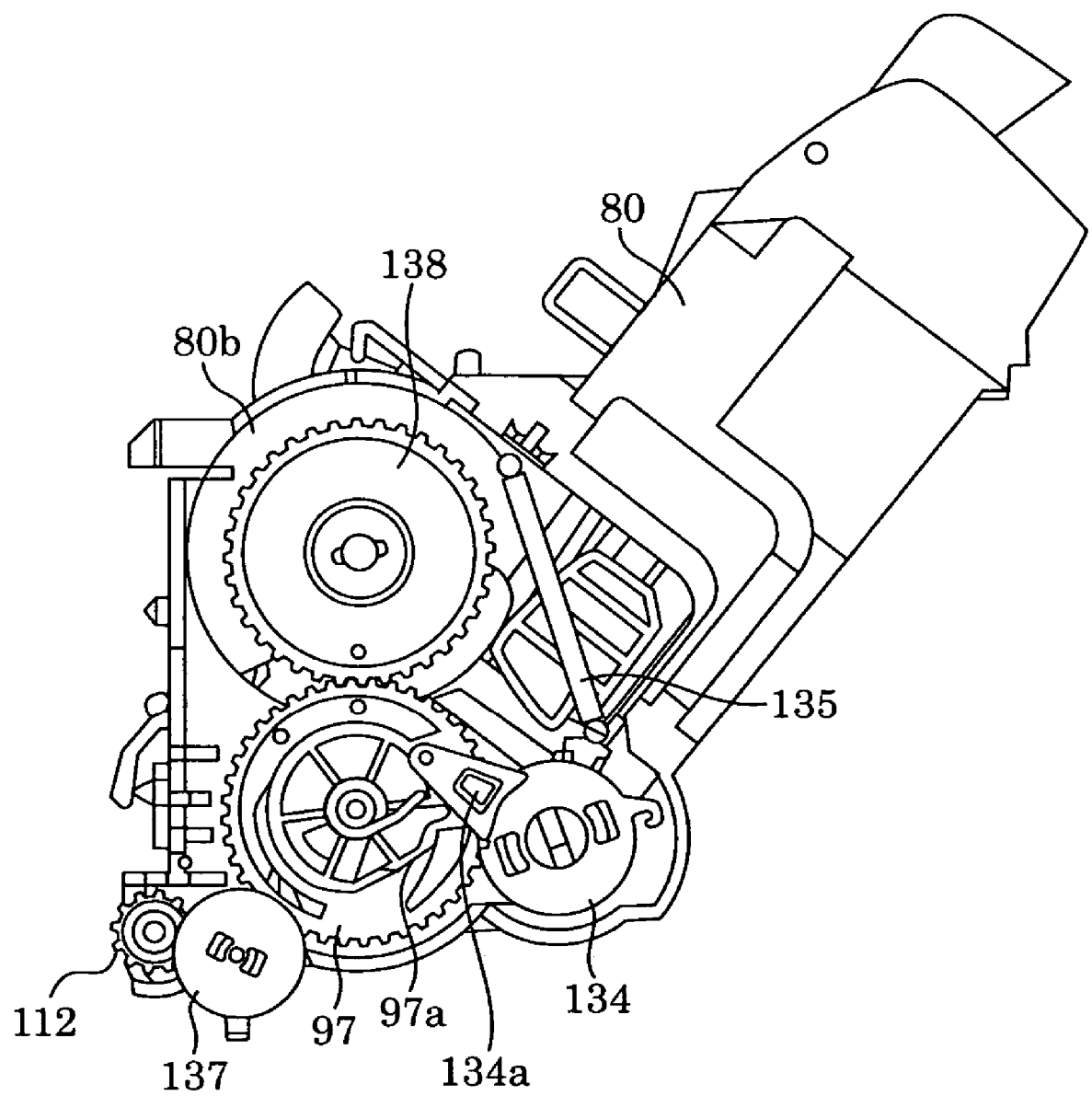
FIG. 10 is a right side view of a driving system in the automatic feeding station.

As shown in FIG. 10, an ASF supply input gear 112, a double gear 137, the control gear 97, a supply-roller gear 138, and the control cam 134 are arranged as a driving mechanism of the automatic feeding station 103 on the right side plate 80*b* of the ASF base 80. The driving cam 97a is provided on the front side of the control gear 97 so as to engage with the driven portion 134a of the control cam 134 in order to control the driving of the control cam 134. A driving cam is also provided on the rear side of the control gear 97 so as to engage with the driven cam 96c of the release cam lever 96 in order to rotate the release cam lever 96. Since the supply-roller gear 138 and the control gear 97 are connected with a speed reduction ratio of 1:1, they constantly rotate at a synchronous phase angle.

Operation of Automatic Feeding Station

Figure 11:
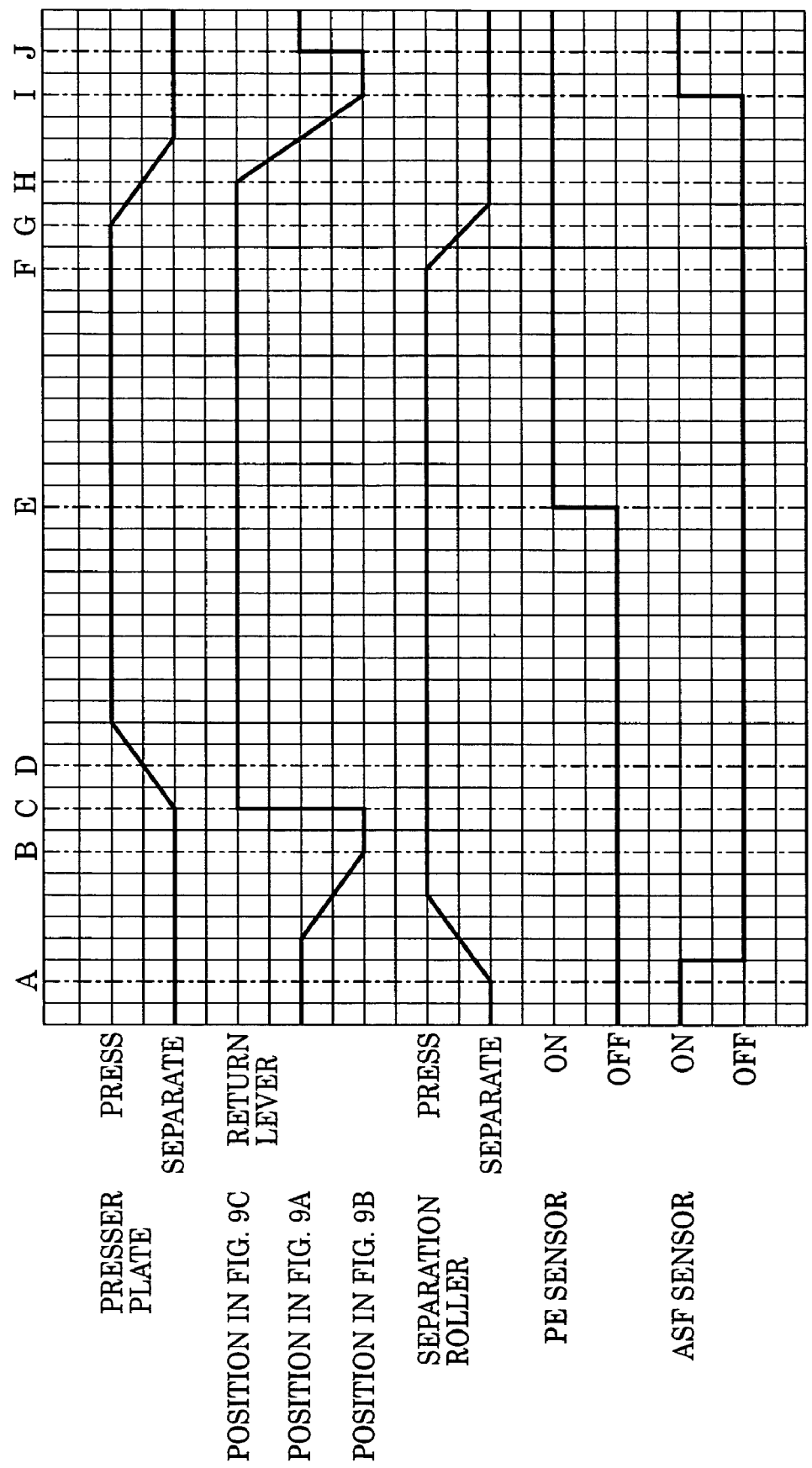
FIG. 11 is a timing chart showing operations performed from when a document is supplied from the automatic feeding station until when reading starts.

The operations of the components of the automatic feeding station 103 will now be described with reference to FIG. 11. FIG. 11 is a timing chart showing operations performed from when a document sheet is supplied from the automatic feeding station 103 until when reading of the document sheet starts.

FIG. 11 shows the relationships between the rotation angle of the supply roller 81, the position of the presser plate 82, the position of the return lever 133, the position of the separation roller 93, the ON or OFF state of the PE sensor lever 21, and the ON or OFF state of the ASF sensor 718 with the sensor flag 81a. Since one document sheet or recording sheet is supplied by one turn of the supply roller 81 in the supply operation, the horizontal axis indicates the rotation angle (0° to 360°) in one turn of the supply roller 81.

In FIG. 11, the left edge of the timing chart indicates a standby state shown in FIG. 1. A series of operations start from the standby state. In this state, the presser plate 82 is held at a position separated from the supply roller 81, the linear portion 81c of the supply roller 81 faces the separation roller 93 and the presser plate 82, and the return lever 133 is at a standby position shown in FIG. 9A. The separation roller 93 is separated from the supply roller 81, and the ASF sensor 718 for detecting the phase of the supply roller 81 is in an ON state.

When the supply roller 81 rotates to an angle A, the separation roller 93 starts to move from the separated position to the pressed position. Then, the ASF sensor 718 is turned off. When the supply roller 81 rotates to an angle B, the return lever 133 turns to the position shown in FIG. 9B, and starts to return the leading edges of document sheets, which may be misaligned during standby, to the leading-edge reference face 80d. When the supply roller 81 rotates near an angle C, the arc-shaped portion 81d thereof faces the separation roller 93. Simultaneously, the movement of the separation roller 93 towards the supply roller 81 is completed, and the separation roller 81 is brought into pressing contact with the arc-shaped portion 81d. When the supply roller 81 rotates to the angle C, the presser plate 82 starts to move towards the supply roller 81. Simultaneously, the return lever 133 turns to the position shown in FIG. 9C so as to be placed outside the sheet running surface. When the supply roller 81 rotates to an angle D, the uppermost one of the document sheets stacked on the presser plate 82 is brought into pressing contact with the supply roller 81. With the pressing contact, several uppermost document sheets are conveyed to the nip 98 between the supply roller 81 and the separation roller 93. Only the uppermost one of the document sheets is separated at the nip 98, and is conveyed downstream. When the supply roller 81 rotates to an angle E, the leading edge of the document sheet reaches the PE sensor lever 21, thereby turning a PE sensor 719 (FIG. 29) on. The leading edge of the recording sheet then reaches nips between the feeding roller 10 and the pinch rollers 16. When the supply roller 81 rotates to an angle F, the separation roller 93 starts to separate from the supply roller 81.

When the supply roller 81 rotates to an angle G, a separating operation of the presser plate 82 is started, and the presser plate 82 moves away from the supply roller 81. When the separation roller 93 separates from the supply roller 81, the sheet supply by the automatic feeding station 103 is completed. Since the separated document sheet is nipped between the feeding roller 10 and the pinch rollers 16, it is continuously conveyed. In this case, the second and subsequent document sheets remain at the nip 98 between the supply roller 81 and the separation roller 93. Therefore, when the supply roller 81 rotates to an angle H, the return lever 133 enters the supply path, and the leading edges of the document sheets are returned by the claws 133b of the return lever 133. When the supply roller 81 rotates to an angle I, the return lever 133 completely returns to the position shown in FIG. 9B, and the leading edges of all the document sheets, except the document sheet that is being conveyed, are conveyed in reverse to the leading-edge reference face 80d. Simultaneously, the ASF sensor 718 is turned off. When the supply roller 81 rotates to an angle J, the return lever 133 returns to the position shown in FIG. 9A, all the mechanisms are brought into a standby state, and the sheet supply operation is completed.

Image Recording Station

Figure 12A:
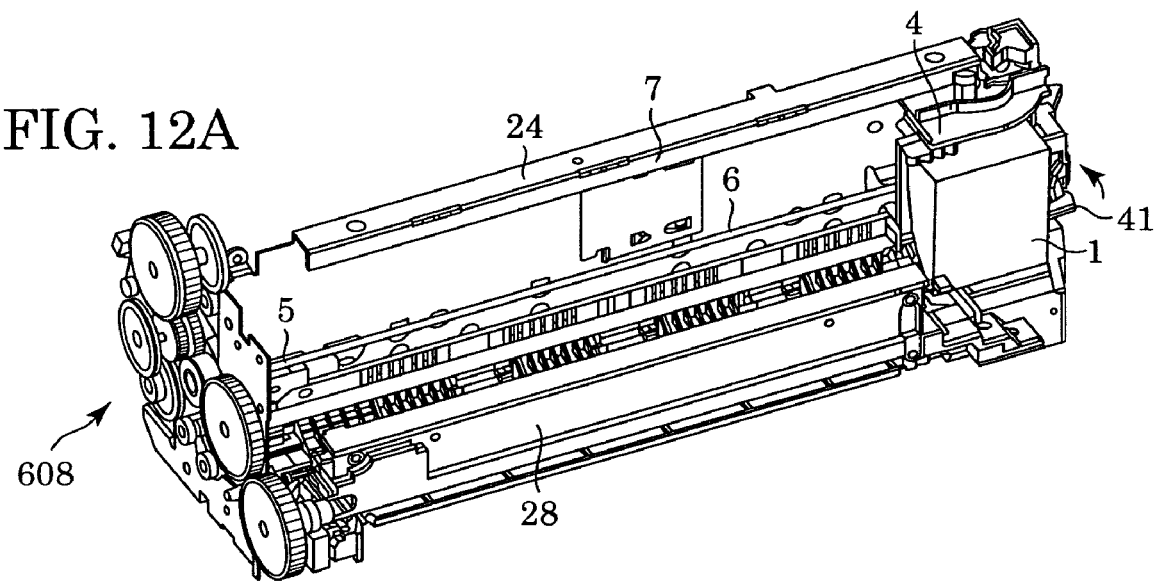
FIGS. 12A, 12B, and 12C are perspective views showing the configuration of an image recording station.
Figure 12B:
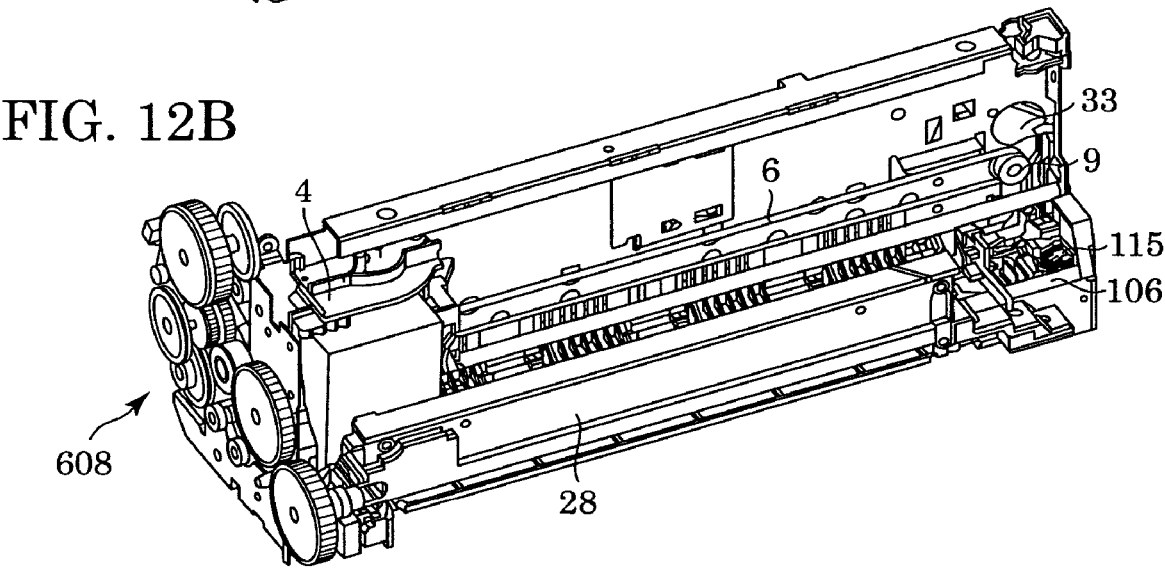
Figure 12C:
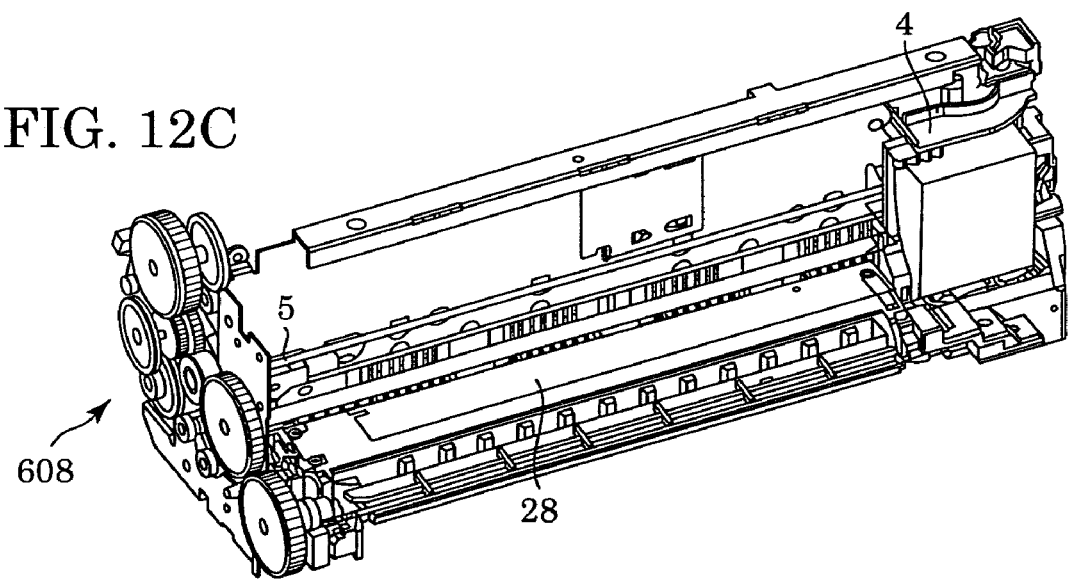

The image recording station 101 will be described with reference to FIGS. 1, 12A, 12B, and 12C. FIGS. 12A to 12C are perspective views showing the configuration of the image recording station 101.

Referring to FIG. 1, the image recording station 101 adopts an ink-jet recording method in which recording is performed by discharging ink from the cartridge 1. The cartridge 1 is mounted on a carriage 4, and scans recording sheets P in the width direction orthogonal to the feeding direction.

As shown in FIGS. 12A and 12B, the carriage 4 is connected to a timing belt 6 that extends between a driving pulley 9 and a driven pulley 5. By rotating the driving pulley 9 by a carriage-driving motor 33, the carriage 4 can reciprocate along a guide rail 7. During such reciprocal movement of the carriage 4, ink is discharged from the cartridge 1 according to image information, thereby recording an image on the recording sheet.

As shown in FIG. 12A, the carriage 4 is normally placed at a standby position (capping position) at one end (right end) of the image recording station 101. When the carriage 4 is at the standby position, a recording head (not shown) of the cartridge 1 is protected by a rubber member 115 shown in FIG. 12B from drying. During a document-image reading operation that will be described later, the carriage 4 also stays at the standby position. When the cartridge 1 runs out of ink, it is placed at the standby position, is detached forward after releasing a hook lever 41, and is replaced with another cartridge.

In the ink-jet recording method, ink sometimes cannot be discharged from the cartridge 1 or cannot be suitably used for recording, for example, because of the entry of bubbles and dust into fine discharge openings, or ink thickening caused by evaporation of ink solvent. In this case, a recording-head recovery unit 106 shown in FIG. 12B performs a head recovery operation for refreshing ink, thereby removing the cause of discharging failure.

While this embodiment of the present invention is applied to a serial recording apparatus in which the recording head moves in a main scanning direction, the present invention is also applicable to a full-line recording apparatus that records an image on a recording sheet with a recording head extending over the entire width of the recording sheet while continuously conveying the recording sheet.

Image Reading Station

Figure 13:
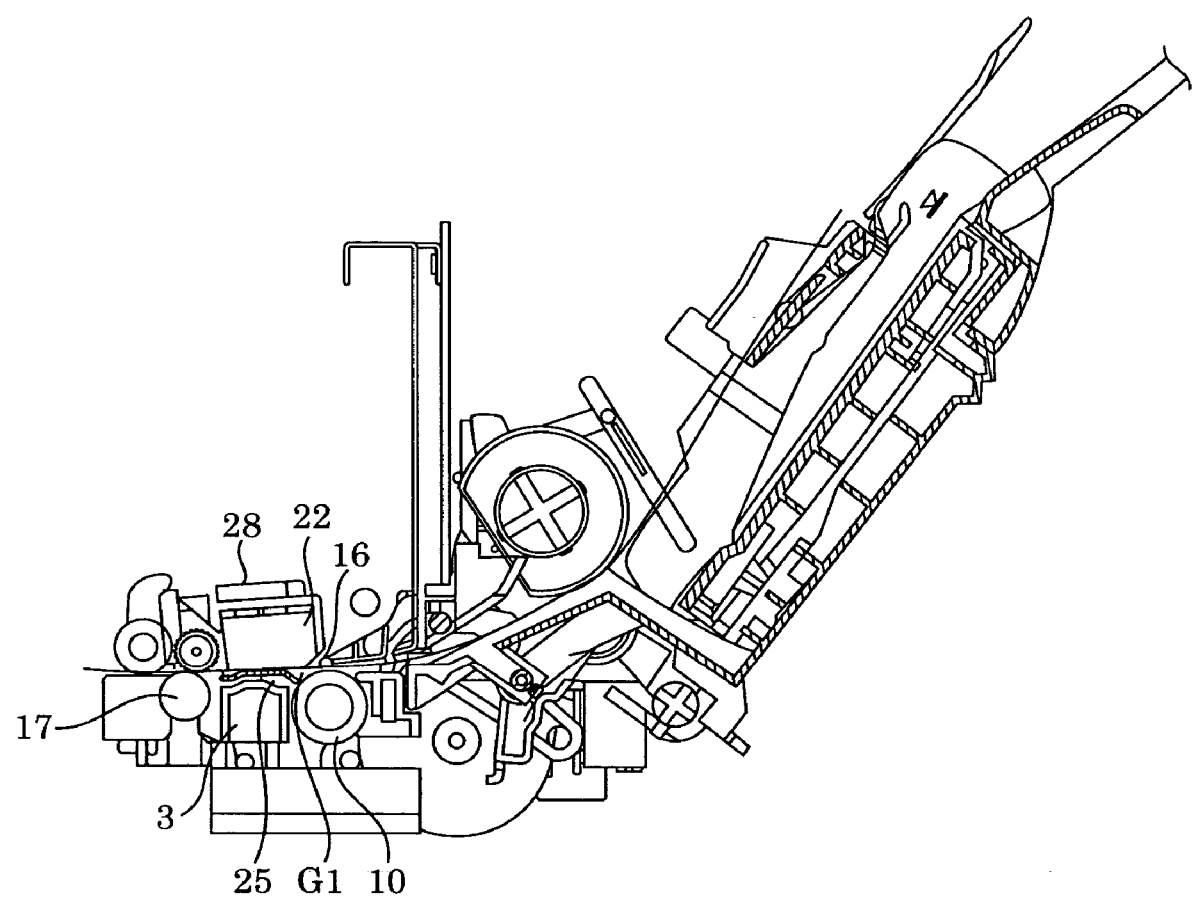
FIG. 13 is a cross-sectional view schematically showing the configuration of the image processing apparatus in which an image reading unit is placed at a reading position.
Figure 14:
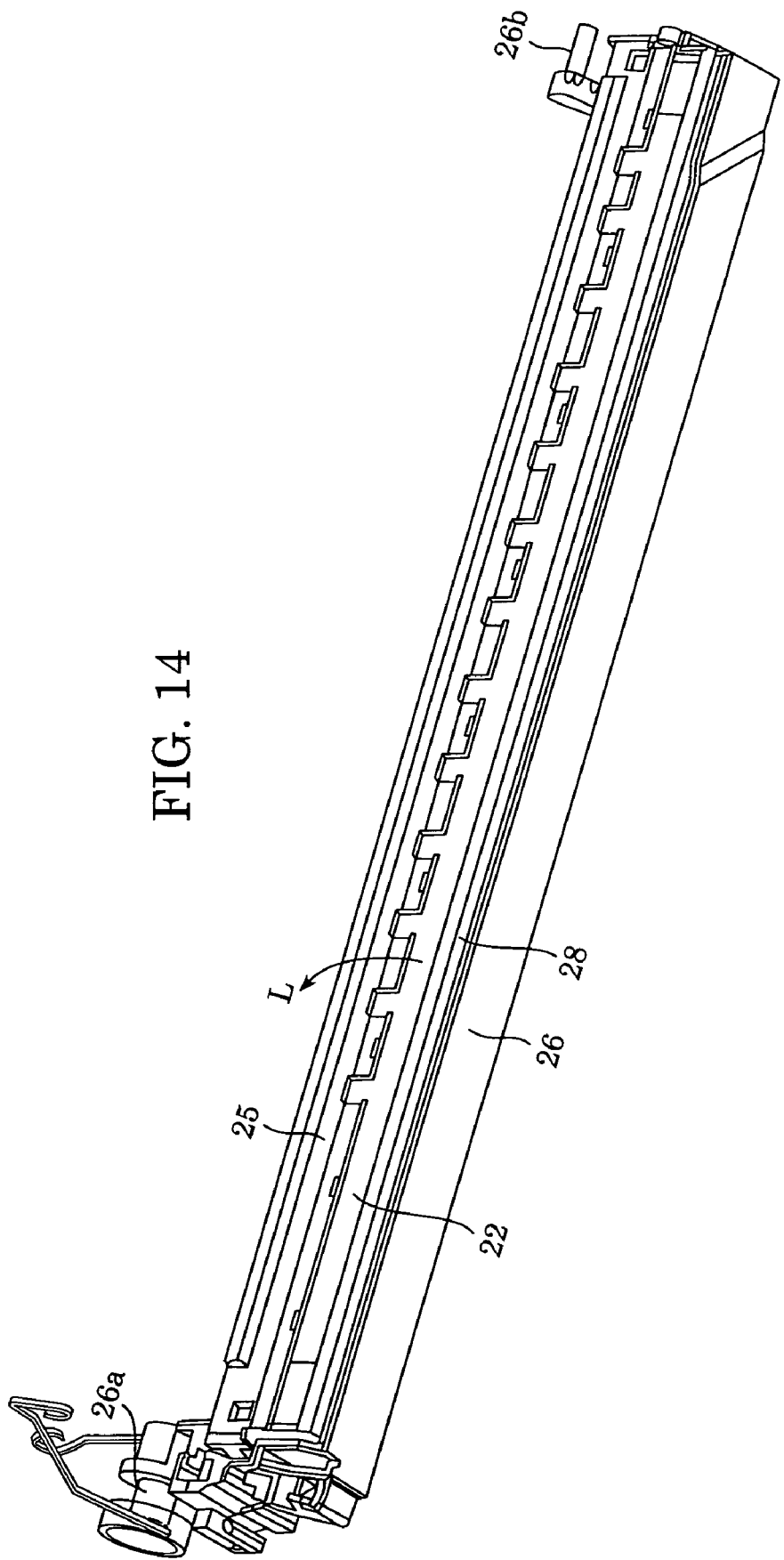
FIG. 14 is a schematic perspective view of the image reading unit.

The image reading station 102 will be outlined with reference to FIGS. 1, 13, and 14. FIG. 13 is a cross-sectional view schematically showing the configuration of the image reading station 102 in a state in which the image reading unit 28 is placed at a reading position, and FIG. 14 is a schematic perspective view of the image reading unit 28.

In the image reading station 102, a document sheet supplied by the above-described supply operation is conveyed to the image reading unit 28 by the feeding roller 10 and the pinch rollers 16 that are also used for recording sheets. While the document sheet is conveyed between the feeding roller 10 and the pinch rollers 16 and between the ejection roller 17 and the spur 18, it is subjected to a reading operation by the image reading unit 28. After the reading operation, the document sheet is ejected out of the apparatus.

When the main section of the apparatus receives a command to read an image for copying or data transmission, driving force is transmitted to a reading-unit lock unit 608 (FIGS. 12A to 12C) by a drive switching operation that will be described later. The image reading unit 28 then turns from a standby position outside the feeding path shown in FIG. 1 to a reading position adjacent to the feeding path shown in FIG. 13. At this reading position, the image reading unit 28 is placed between the feeding roller 10 and the ejection roller 17 so as to face the platen 3 within the moving range of the carriage 1, and reads information on the upper surface of the conveyed document sheet. By thus placing the image reading unit 28 inside the moving range of the carriage 1, the total size of the facsimile apparatus can be reduced. During image recording, the image reading unit 28 is shifted to the standby position outside the moving range of the carriage 1, as shown in FIG. 1, and therefore, it does not interfere with the movement of the carriage 1.

The image reading unit 28 will be described with reference to FIGS. 13 and 14. The image reading unit 28 includes a contact image sensor (hereinafter abbreviated as CS) 22 serving as a reading unit, a CS holder 26 for holding the CS 22, and a white reference member 25 held by the CS holder 26 so as to oppose the CS 22.

The CS 22 is disposed in a recess of the CS holder 26 so that its sensor surface faces outward, and is fixed by unshown screws (fastening members). The white reference member 25 is formed by attaching a white sheet onto a metal plate. The metal plate includes a flat surface on which the white sheet is attached, and bent portions provided at both longitudinal ends of the flat surface. The bent portions respectively have coaxial holes. By fitting a shaft of the CS holder 26 in these holes, the white reference member 25 is supported to turn relative to the CS holder 26 and the CS 22. In a normal state, the white reference member 25 is biased toward the CS 22 by a helical torsion spring (not shown). By being thus biased, the white reference member 25 can be placed at a normal position such as to form a space G1 through which one document sheet can pass, and a cleaning position separate from the CS 22 against the force of the helical torsion spring (the direction of arrow L in FIG. 14). Even when the white sheet of the white reference member 25 or the reading surface of the CS 22 is soiled with, for example, ink mist from the image recording station 101, the user can easily clean the soiled portion in a state in which the white reference member 25 is placed at the cleaning position. This enhances maintainability.

As shown in FIG. 14, a boss 26a and a boss 28b are provided on both longitudinal side walls of the CS holder 26. Shafts of the bosses 26a and 28b are engaged with and rotatably supported by bearings (not shown) provided in the platen 3. These right and left engaging portions are coaxial. Therefore, the CS holder 26 can move from the standby position to the reading position when the cartridge 1 is placed at the capping position (FIG. 12A) at one end (right end) of the carriage moving range, as viewed from the ejection side, as described above. The reading position is provided within the moving range of the carriage 4. A reading feeding path defined by the space between the reading surface of the CS 22 and the white reference member 25 is flush with a recording-sheet support surface defined by the platen 3.

The metal plate of the white reference member 25 is comb-shaped on the upstream side in the document feeding direction, as shown in FIG. 14, and the ribs 38 of the platen 3 are placed between comb teeth. The metal plate of the white reference member 25 also has a bent portion on the downstream side in the document feeding direction in order to increase the strength in the longitudinal direction. When the CS holder 26 moves to the reading position, the bent portion is put in the platen 3. Consequently, during document reading, the reading feeding path defined by the white reference member 25 and the CS 22 and the recording support surface defined by the platen 3 are flush each other between the feeding roller 10 and the ejection roller 17.

Reading Driving System

Figure 15:
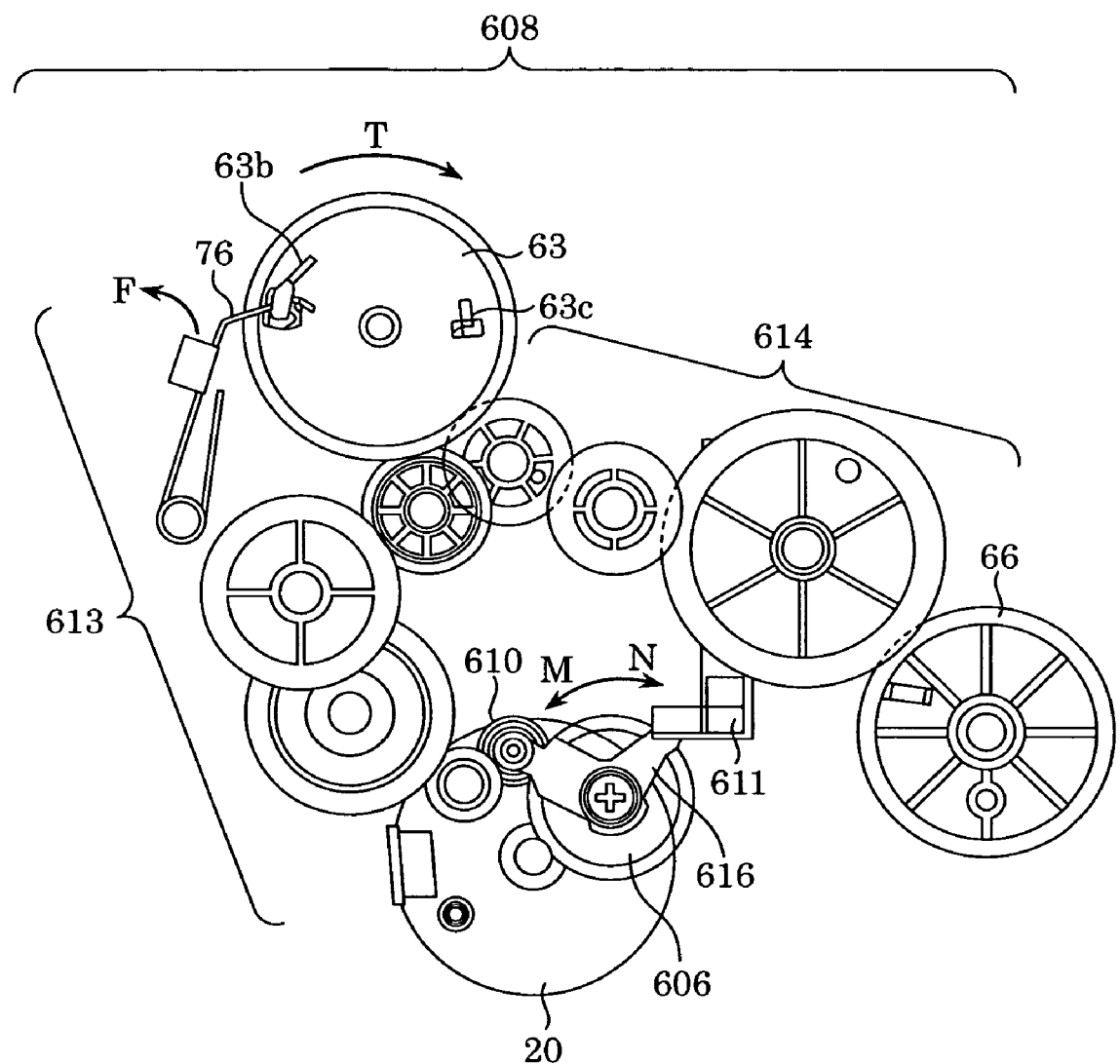
FIG. 15 is a side view of a reading driving system.
Figure 16A:
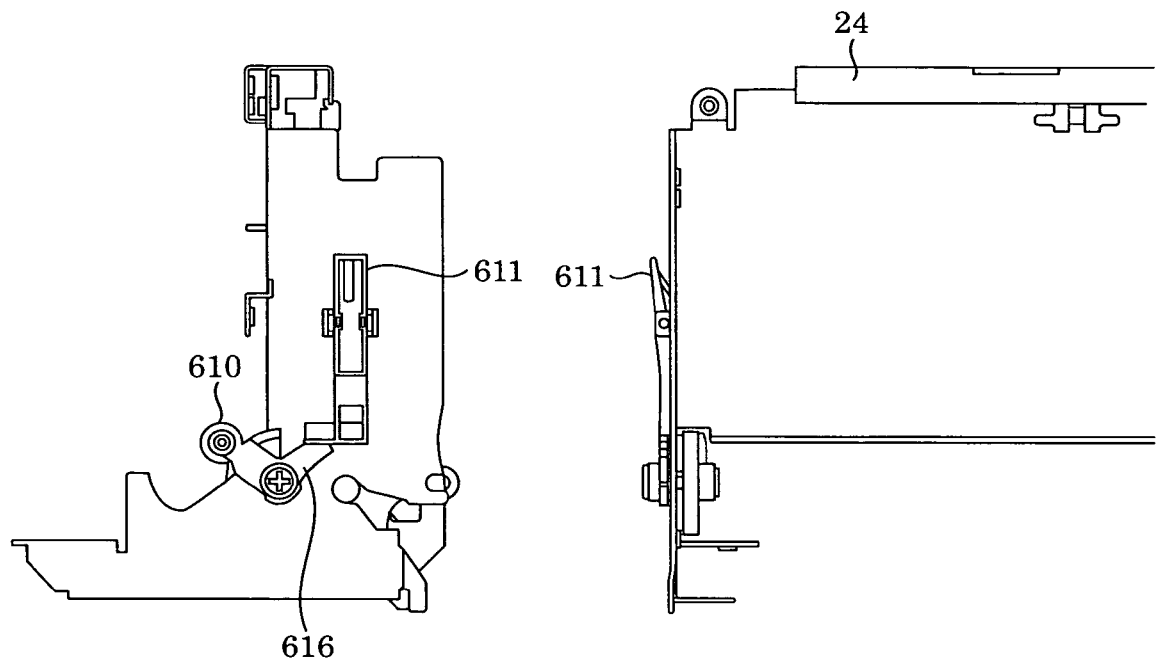
FIGS. 16A and 16B are schematic views showing the motion of a stopper.

The moving mechanism for the image reading unit 28 will now be described in detail with reference to FIGS. 12 to 16. FIG. 15 is a side view of the reading driving system, FIGS. 16A and 16B are schematic views showing the motion of a stopper, and FIG. 17 is a perspective view showing a spring that engages with the image reading unit 28.

FIG. 15 shows the reading-unit lock unit 608 (FIG. 12). A driving motor 20 is connected to a first planetary gear 610 via a first sun gear 606. In this embodiment, when the driving motor 20 rotates forward (clockwise in FIG. 15), the first planetary gear 610 moves in the direction of arrow M towards the reading-unit lock unit 608 (toward a first transmission units 613 that will be described below). When the driving motor 20 rotates in reverse, the first planetary gear 610 moves in the direction of arrow N towards a reading-unit release unit 612 shown in FIG. 22. In a normal state (recording state), the forward motion of the first planetary gear 610 is not transmitted even when the driving motor 20 rotates forward, because a first pendulum arm 616, which rotatably supports the first planetary gear 601 and has the same orbit, is regulated by a gate member 611, as shown in FIG. 16A.

Figure 16B:
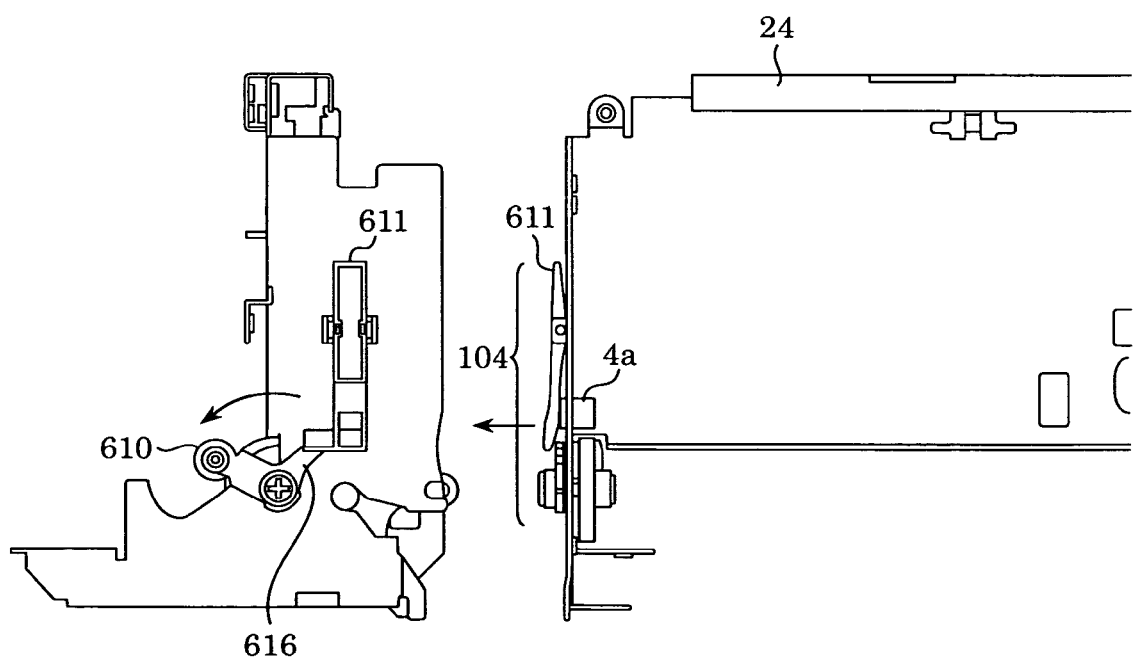
Figure 17:
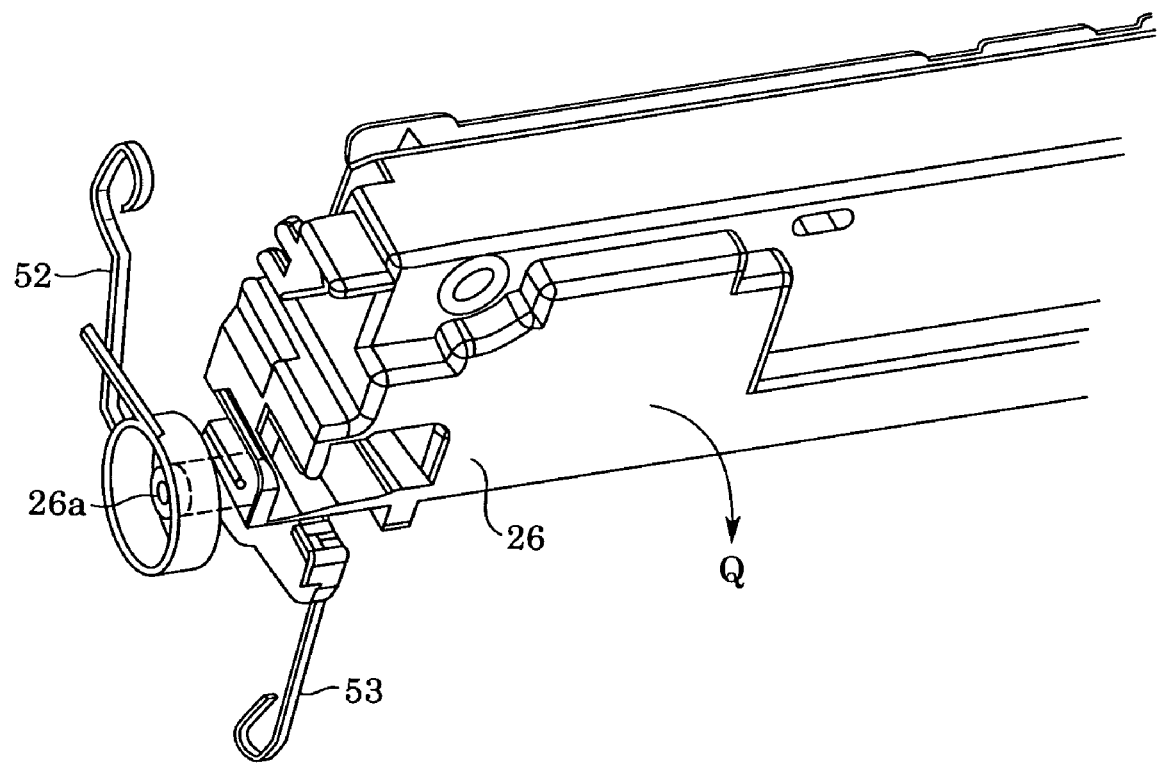
FIG. 17 is a perspective view of springs engaged with the image reading unit.

In order to perform switching from a standby state to the reading state, as shown in FIGS. 12B and 16B, the carriage 4 is moved to the left end of the moving range so that a projection 4a thereof presses the gate member 611. In this state, the driving motor 20 is rotated forward, and the first pendulum arm 616 is put inside the gate member 611. The gate member 611 and the projection 4a constitute a first drive switching unit 104. Consequently, the first planetary gear 610 is meshed with the reading-unit lock unit 608. After that, the carriage 4 returns to the capping position (standby position) so as not to interfere with the movement of the CS 22 to the reading position.

After the gate release (drive switching) operation is completed, the driving force from the driving motor 20 is allowed to be transmitted to the reading-unit lock unit 608, unless the driving motor 20 rotates in reverse. Even when the carriage 4 is returned to the standby position and the driving motor 20 is rotated forward by a means that will be described later, the driving force of the driving motor 20 is not transmitted to the automatic feeding station 103.

In the standby state, the CS holder 26 is biased in the direction of arrow Q by a reading-unit push-up spring 53 so as to be held at the standby position, as shown in FIG. 17. When an image reading operation starts, the driving force of the driving motor 20 is transmitted to the reading-unit lock unit 608 by the above first drive switching unit 104, and a reading-unit push-down spring 52 is turned by a reading-unit driving gear 66 that will be described later to produce a torque larger than that of the reading-unit push-up spring 53, thereby turning the image reading unit 28. After the image reading unit 28 is turned from the standby position to the reading position, it is maintained at the reading position by the following lock operation.

Reading-Unit Lock Unit

A detailed description will be given of the reading-unit lock unit 608 that maintains the image reading unit 28 in a reading state, with reference to FIGS. 18 to 21. FIGS. 18A and 18B are schematic views showing the configuration of the reading driving system, FIG. 19 is a schematic view showing the shape of a cam of a driving substrate, FIGS. 20A and 20B are side views of the reading driving system, and FIGS. 21A and 21B are schematic views showing the cam and a moving member of the driving substrate.

Figure 19:
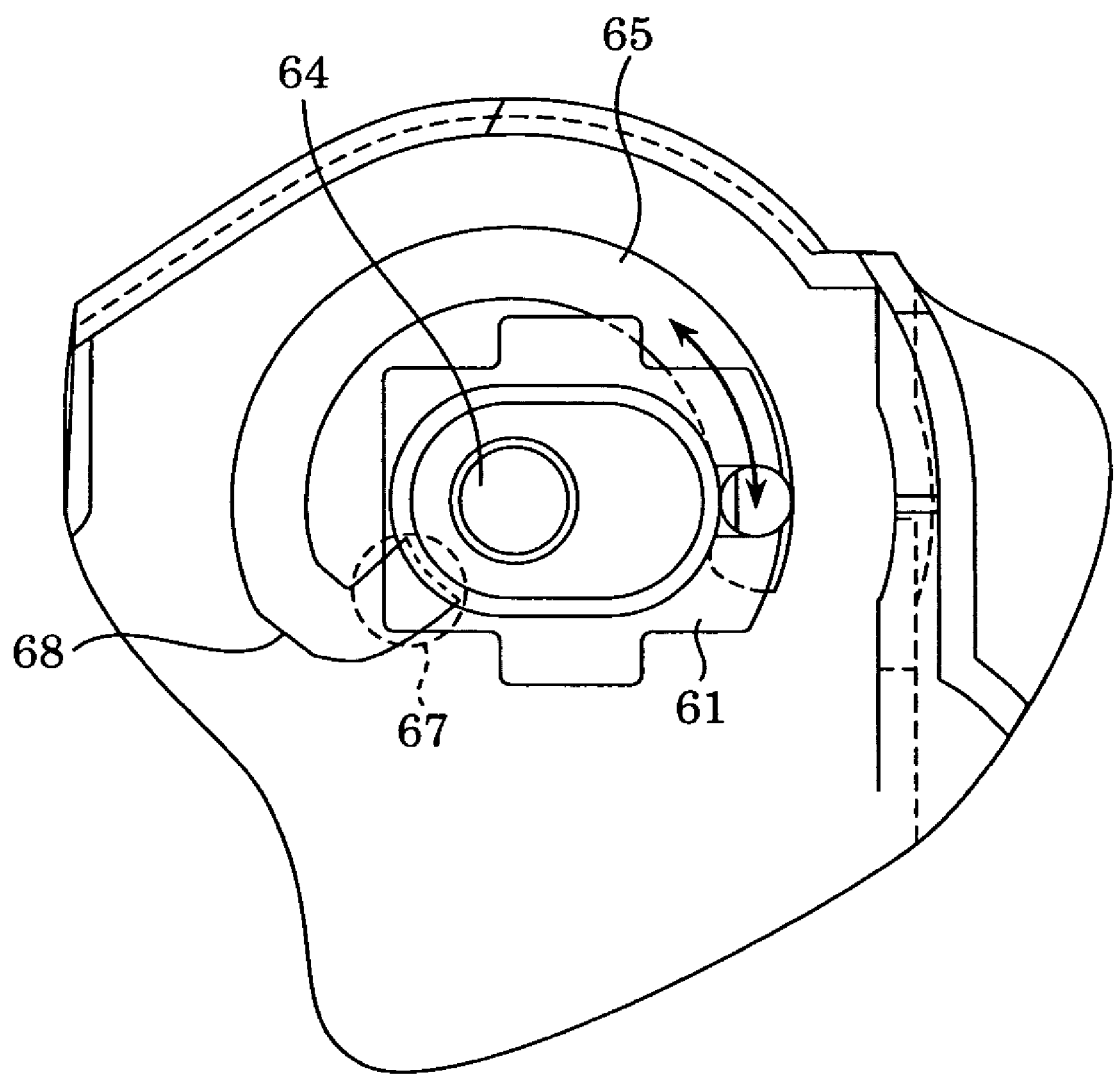
FIG. 19 is a schematic view showing the shape of a cam of a driving substrate.

The reading-unit lock unit 608 includes a driving substrate 60, a moving member 61, a moving-member gear 62, and a moving-member shaft 64 shown in FIG. 18A, an arc-shaped slit 65 provided in the driving substrate 60 so as to be centered on the moving-member shaft 64, as shown in FIG. 19, and a moving-member pressing gear 63, a reading-unit driving gear 66, the first transmission unit 613, and a second transmission unit 614 shown in FIG. 15.

The moving member 61 is movable in the radial direction of the moving-member gear 62, as shown in FIG. 18B. The moving member 61 is also allowed to move in the circumferential direction and radial direction relative to the moving-member shaft 64, by the slit 65, a slit lock portion 67 provided at an end of the slit 65 to retain the moving member 61, and a slit cam portion 68 for guiding the moving member 61 to the slit lock portion 67, as shown in FIG. 19. The moving-member pressing gear 63 shown in FIG. 15 is supported coaxially with the moving-member gear 62, and turns the moving member 61 around the moving-member shaft 64.

Figure 20A:
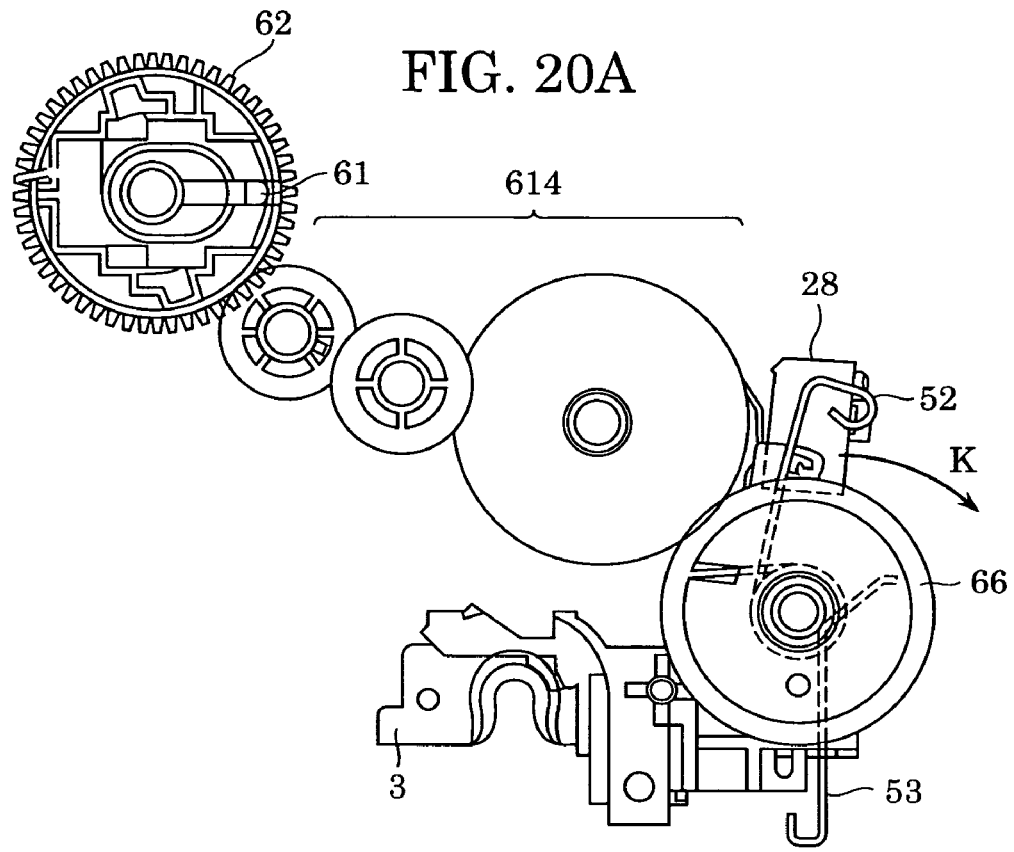
FIGS. 20A and 20B are side views of the reading driving system.
Figure 20B:
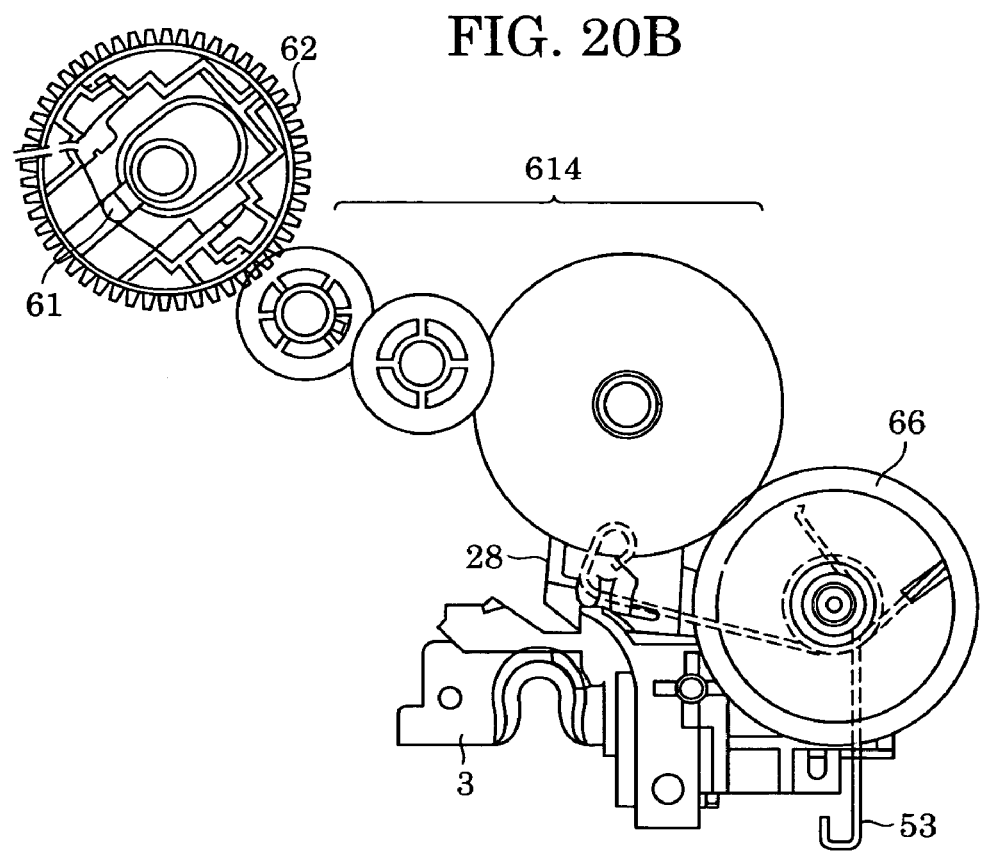
Figure 21A:
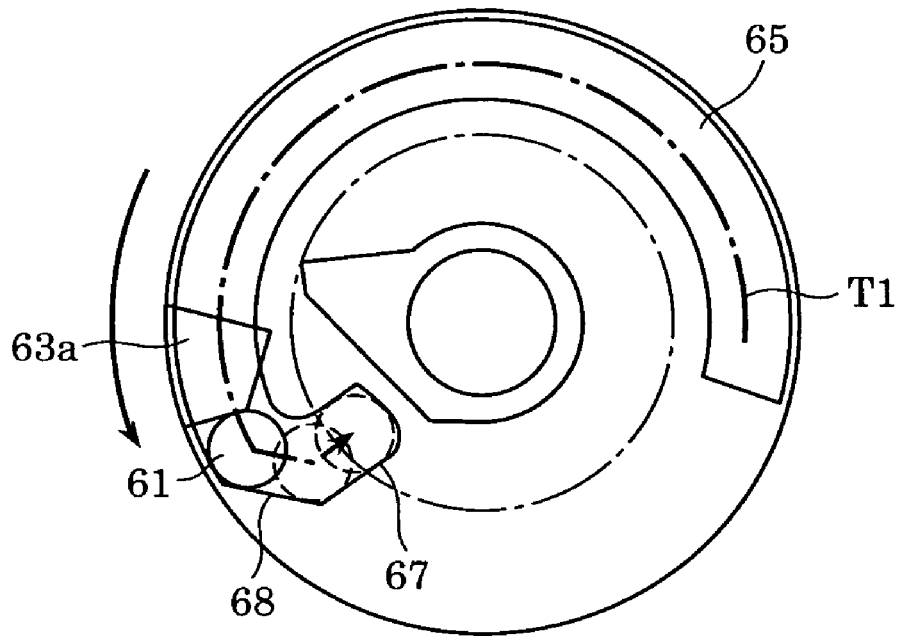
FIGS. 21A and 21B are schematic views showing the cam of the driving substrate and a moving member.
Figure 21B:
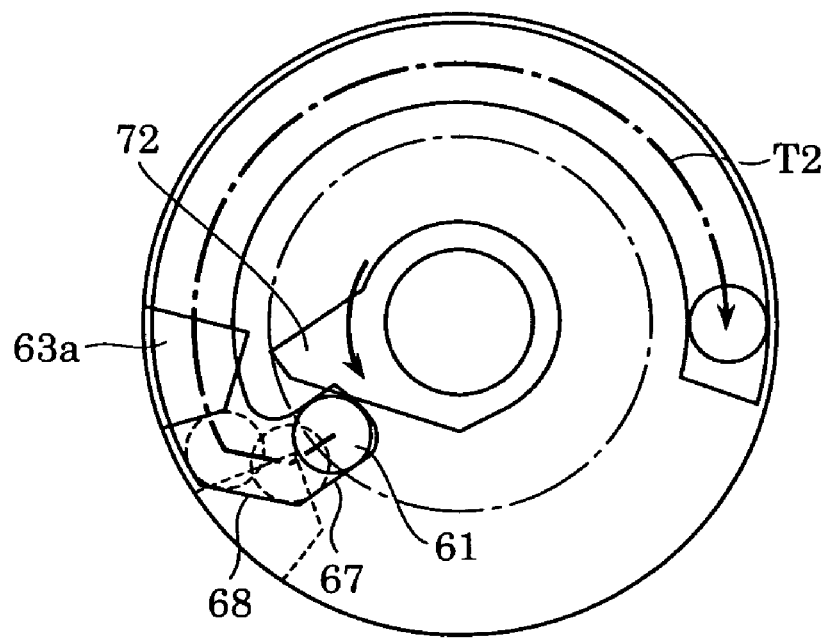

The reading-unit driving gear 66 rotates while retaining one arm of the reading-unit push-down spring 52, as shown in FIG. 20A, thereby produces a torque (in a counterclockwise direction in FIG. 20B) larger than the push-up force of the reading-unit push-up spring 53, and as a result, turns the CS holder 26. The first transmission unit 613 transmits the driving force from the first planetary gear 610 to the moving-member pressing gear 63 (FIG. 15). The driving force is transmitted from the moving-member gear 62 to the reading-unit driving gear 66 by the second transmission unit 614.

The moving-member gear 62 that movably holds the moving member 61 is designed to rotate in the same phase as that of the reading-unit driving gear 66, as shown in FIGS. 20A and 20B. Therefore, in order to maintain the image reading unit 28 in a reading state, the moving-member gear 62 is held in a reading phase. Accordingly, as shown in FIGS. 21A and 21B, the slit lock portion 67 for retaining the moving member 61, and the slit cam portion 68 for guiding the moving member 61 to the slit lock portion 67 are provided at an end of the slit 65. A protrusion 63a is provided on the rear side of the moving-member pressing gear 63, and pushes the moving member 61 along a trajectory T1 shown in FIG. 21A. Since the moving-member pressing gear 63 rotates coaxially with the moving-member gear 62, it can move the moving member 61 to the slit cam portion 68. When the moving member 61 reaches the slit cam portion 68, it further moves to the slit lock portion 67 along an inclined face of the protrusion 63a after its trajectory is changed by the slit cam portion 68.

Since the moving-member gear 62 holding the moving member 61 is connected to the reading-unit driving gear 66 and the second transmission unit 614 composed of a train of idler gears, it constantly receives a torque such as to return the CS holder 26 into a standby state (in the direction of arrow K in FIG. 20A). Against the return torque, the moving-member pressing gear 63 moves the moving member 61 to the slit lock portion 67, and retains the moving member 61 thereat. After the moving member 61 is retained at the slit lock portion 67, the return torque functions as a force such that the moving member 61 stays in the slit lock portion 67. The retained state is maintained unless the moving member 61 is returned to the arc-shaped portion of the slit 65 by a release cam 72 that will be described later.

In this embodiment, the slit lock portion 67 is at angle of about 12° to the normal direction. This angle is optimized so that the above-described force for holding the moving member 61 in the slit lock portion 67 is not reduced, for example, even when the slit lock portion 67 is worn with time.

The moving-member pressing gear 63 is designed to idle forward and in reverse after the protrusion 63a thereof pushes the moving member 61 in the slit lock portion 67. The slit lock portion 67 is provided to be spaced about 220° apart from the standby position of the moving member 61 so that the push-down torque produced by the reading-unit push-down spring 52 sufficiently overcomes the push-up torque.

Reading-Unit Release Unit

Figure 22:
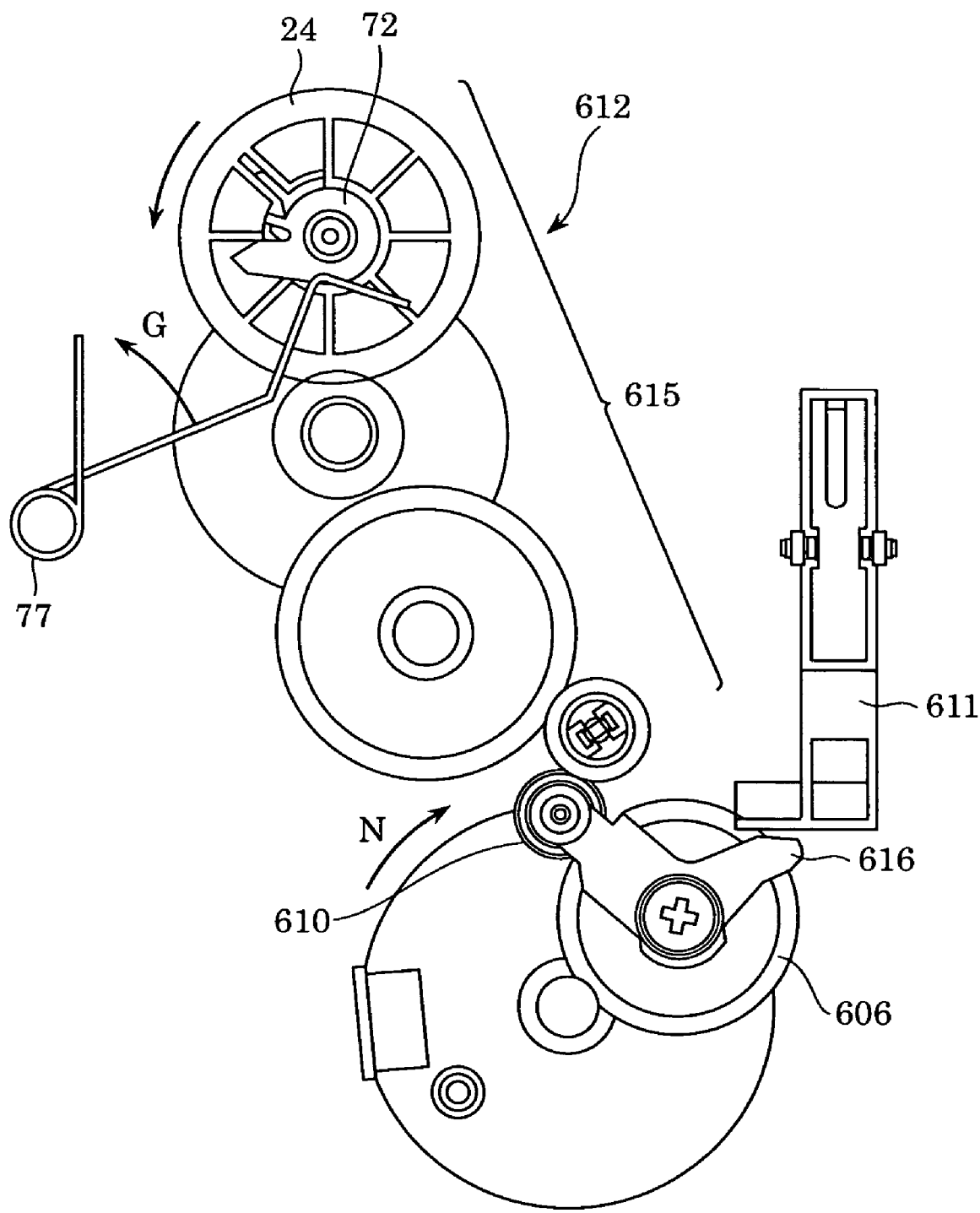
FIG. 22 is a side view of the reading driving system.
Figure 23:
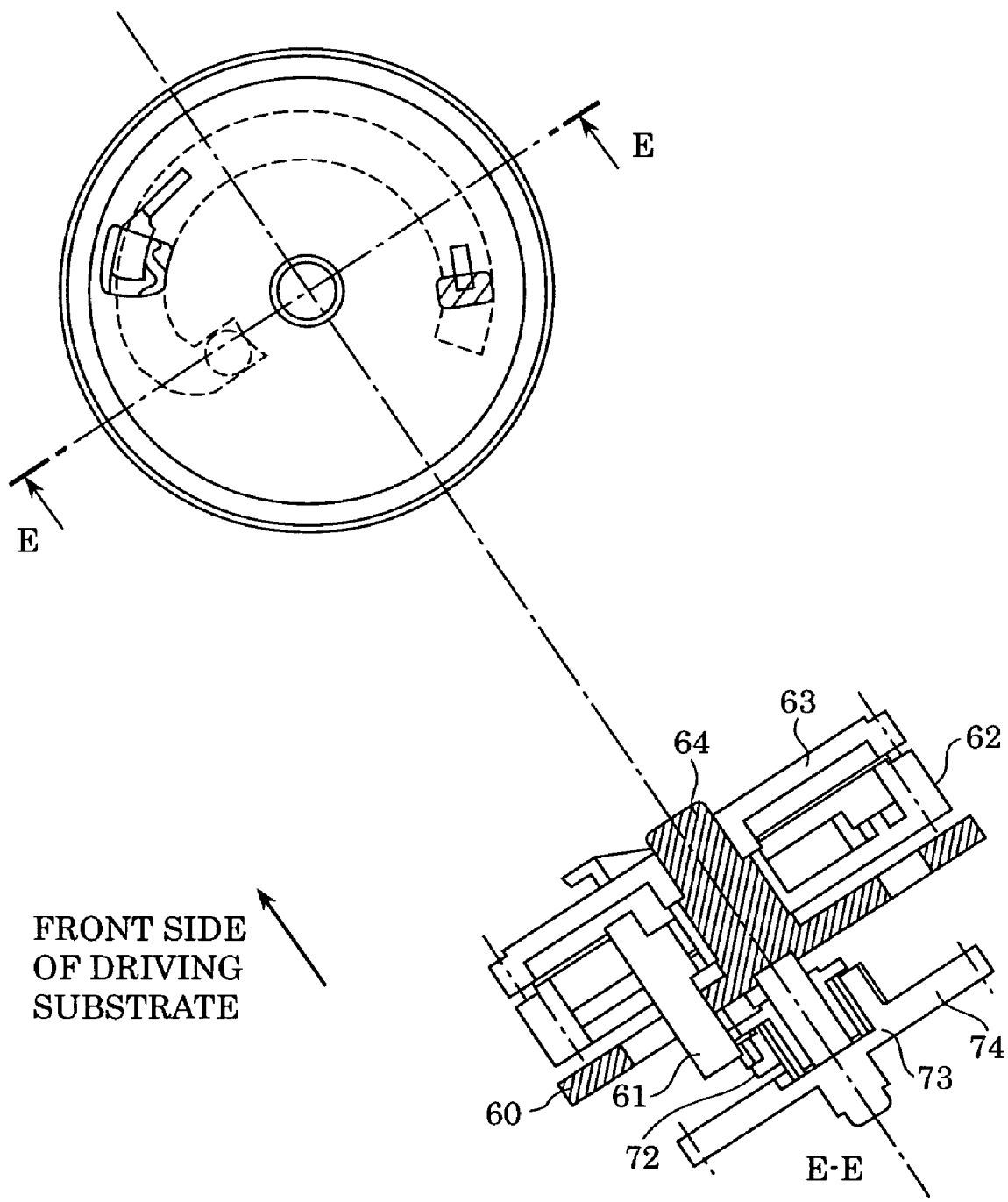
FIG. 23 is a schematic view showing the configuration of the reading driving system.

A description will be given of an operation for returning the image reading unit 28 from a reading state to a standby state, with reference to FIGS. 21B, 22, and 23. FIG. 22 is a side view of the reading driving system, and FIG. 23 is a schematic view showing the structure of the reading driving system.

As described above, the moving member 61 is retained at the slit lock portion 67 of the driving substrate 60 in a reading state. In order to release this state, there are provided a release cam 72 provided on the rear side of the driving substrate 60, a release gear 74 that rotates coaxially with the release cam 72 and has a projection (not shown) for pressing the release cam 72, and a third transmission unit 615 that transmits the driving force from the first planetary gear 610 to the release gear 74.

The return operation will be described in detail below. The moving member 61 is retained at the slit lock portion 67 in a reading state, as described above. Since the slit 65 is provided through the driving substrate 60, as shown in FIG. 23, it is possible to access an end of the moving member 61 from the rear side of the driving substrate 60. The release cam 72 is rotatably provided to push the moving member 61 into an arc-shaped trajectory outside the slit lock portion 67 and the slit cam portion 68. When the moving member 61 is pushed out from the slit lock portion 67 by the release cam 72, it is returned to the standby position along a trajectory T2 shown in FIG. 21B by the reading-unit push-down spring 52. Once the moving member 61 is put in the arc-shaped trajectory, it returns to the standby position with the rotation of the moving-member gear 62 because the moving-member gear 62 receives a return torque from the reading-unit push-up spring 53, as described above.

As shown in FIG. 22, when the driving motor 20 is rotated in reverse, the first planetary gear 610 is rotated in the direction of arrow N, and the transmission path of the driving force to the first transmission unit 613 is switched to a transmission path to the third transmission unit 615. When switching is performed, the first pendulum arm 616 placed under the gate member 611 returns to its initial state. Therefore, even when the driving motor 20 rotates forward, the driving force is not transmitted to the first transmission unit 613. That is, once the image reading unit 28 is moved to the reading position and the driving motor 20 is rotated in reverse, even when a sheet supply operation or a document feeding operation is performed later, the image reading unit 28 does not move. Since the image reading unit 28 does not move simultaneously with the supply and feeding operations in this way, the driving load of the driving motor 20 is reduced.

The release gear 74 serving as the last stage of the third transmission unit 615 rotates coaxially with the release cam 72, and transmits the driving force from the driving motor 20 to the release cam 72 by pressing the release cam 72 with the projection thereof. The release gear 74 also has a timer member 73, as shown in FIG. 23. Since the release cam 72 is constantly biased by the timer member 73 so as to be furthest apart from the projection of the release gear 74, it receives the driving force from the driving motor 20 after a time lag. Accordingly, in a reverse rotation with a small number of steps, such as an operation of positioning the leading edge of a document, the driving force is not transmitted to the release cam 72. Therefore, the image reading unit 28 is not returned to the standby state.

The reading-unit lock unit 608 and the reading-unit release unit 612 described above are respectively provided on the front side and the rear side of the driving substrate 60, as shown in FIG. 23. That is, the moving-member pressing gear 63 for locking the moving member 61, the moving member 61, the moving-member gear 62 for slidably holding the moving member 61, the driving substrate 60 including the slit lock portion 67, the release cam 72, the timer member 73, and the release gear 74 for driving the release cam 72 are arranged in that order from the front side. In this way, the reading-unit lock unit 608 for moving the image reading unit 28 to the reading position is provided on the front side of the driving substrate 60, and the reading-unit release unit 612 for returning the locked image reading unit 28 to the standby position is provided on the rear side of the driving substrate 60. This simplifies the configuration of the entire driving system, reduces the area of the driving substrate 60, and thereby reduces the total size of the apparatus.

Regulating Members

A first regulating member and a second regulating member will now be described with reference to FIGS. 15, 21, and 22. In order to move the image reading unit 28 from the standby position to the reading position, the moving-member pressing gear 63 is rotated via the first transmission unit 613 so that the protrusion 63a of the moving-member pressing gear 63 moves the moving member 61 to the slit lock portion 67, as described above. Subsequently, the moving-member pressing gear 63 continues to idle until the driving motor 20 is driven by a predetermined amount. In a case in which the protrusion 63a is placed near the slit lock portion 67 at the moment of completion of the driving, the release cam 72 cannot push out the moving member 61 into the slit 65 because of interference with the protrusion 63a. Accordingly, in this embodiment, a first regulating member 76 made of an elastic material is provided on the driving substrate 60, as shown in FIG. 15.

A movable arm of the first regulating member 76 engages with a retaining portion 63b of the moving-member pressing gear 63 in a region in which the protrusion 63a must not stop, thereby producing a torque in a direction opposite the rotating direction of the moving-member pressing gear 63 (direction of arrow F in FIG. 15). Therefore, even when the transmission of the driving force is finished in this range, the protrusion 63a is pushed back to a position such as not to affect the release operation.

The moving-member pressing gear 63 also has a small retaining portion 63c spaced approximately 180° apart from the retaining portion 63b. When the moving-member pressing gear 63 is rotated in a direction (direction of arrow T in FIG. 15) opposite the rotating direction by the torque in the direction of arrow F, the protrusion 63a is prevented by the small retaining portion 63c from entering the non-stop region from the opposite direction.

A second regulating member will now be described. In order to return the image reading unit 28 from the reading position to the standby position, the release cam 72 is rotated via the third transmission unit 615 to push the moving member 61 into the slit 65, as described above. Subsequently, the release cam 72 continues to idle until the driving motor 20 is driven by a predetermined amount. In a case in which the apex of the release cam 72 is placed near the slit lock portion 67 at the moment of completion of the driving, the moving-member pressing gear 63 cannot push the moving member 61 into the slit lock portion 67 because of interference with the apex.

Accordingly, in this embodiment, a second regulating member 77 made of an elastic material similar to the first regulating member 76 is provided on the driving substrate 60, as shown in FIG. 22. A movable arm of the second regulating member 77 engages with a projection (not shown) of the release cam 72 in a region where the apex of the release cam 72 must not stop, and produces a torque in a direction (direction of arrow G in FIG. 22) opposite the rotating direction of the release cam 72. Therefore, even when the transmission of the driving force from the driving motor 20 is finished in this range, the apex of the release cam 72 is pushed back to a position such as not to affect the lock operation.

Second Drive Switching Unit

A second drive switching unit will now be described as an example of a clutch that selectively transmits the driving force from the driving motor 20 to the automatic feeding station 103, with reference to FIGS. 24 to 28.

Figure 24:
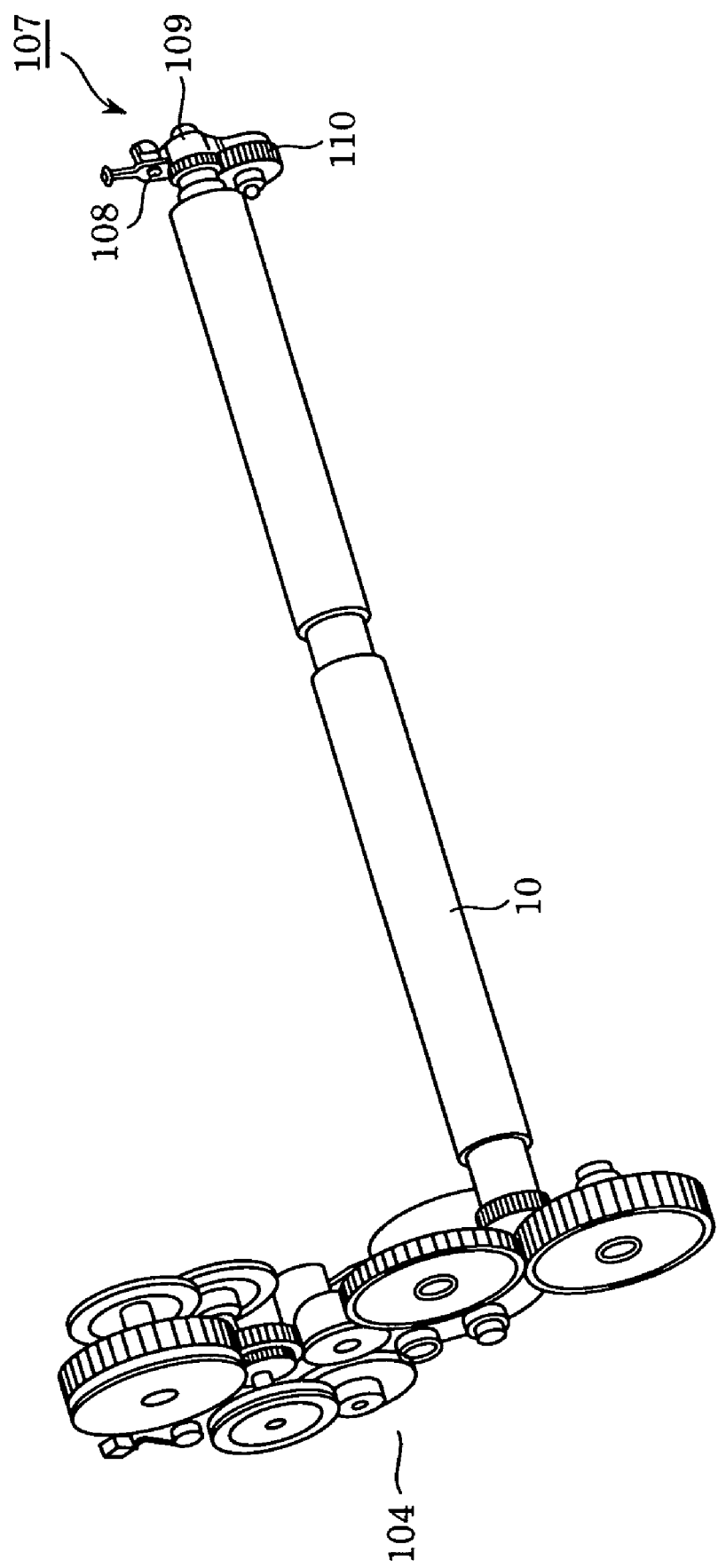
FIG. 24 is an explanatory view showing the position of a second drive switching unit with respect to a feeding roller.

As shown in FIG. 24, a second sun gear 108 is fixed at a shaft end of the feeding roller 10 remote from the first drive switching unit 104 in the lateral direction of the apparatus. A second pendulum arm 109 is turnably supported by the feeding roller 10 outside the second sun gear 108 in the axial direction. A second planetary gear 110 rotatably supported with a predetermined frictional load is attached to the second pendulum arm 109 so as to be meshed with the second sun gear 108. These components constitute a second drive switching unit 107.

Figure 25A:
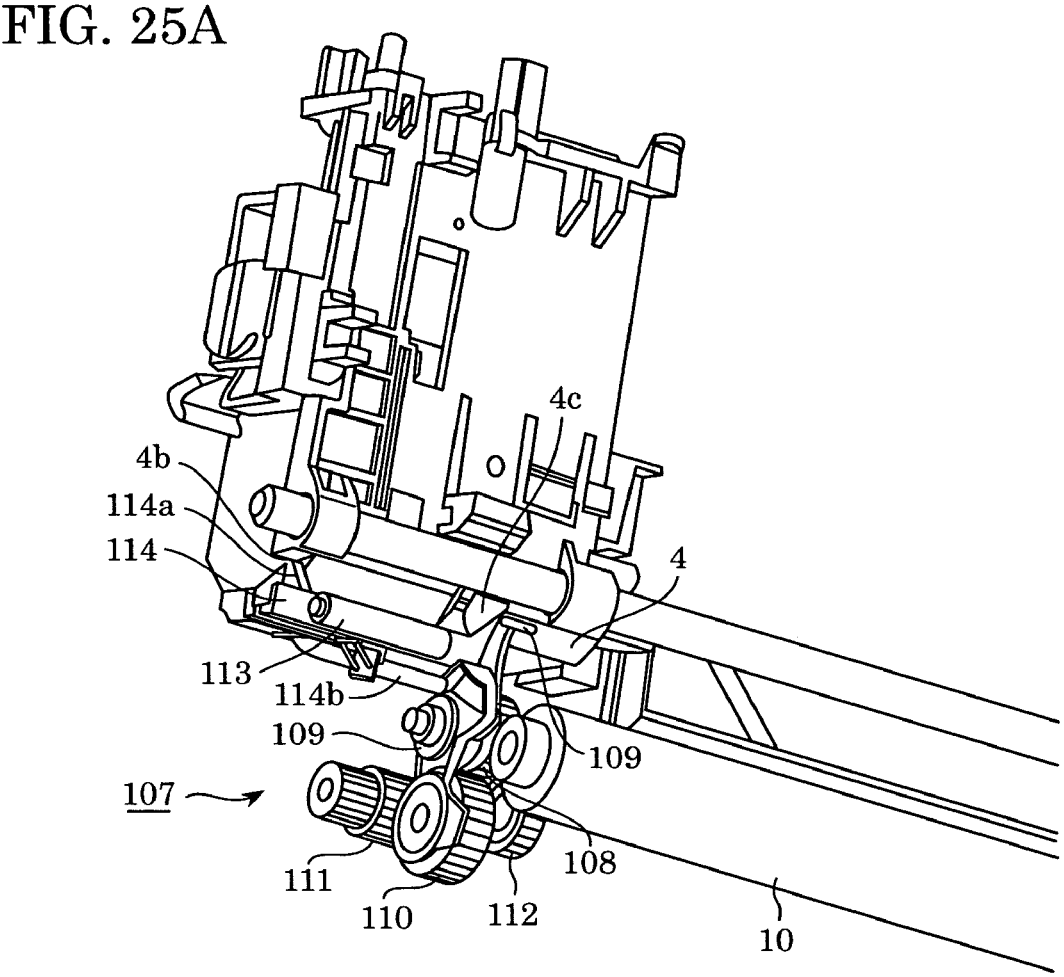
FIGS. 25A and 25B are perspective views showing the configuration of the second drive switching unit.

As shown in FIGS. 25A and 26A, a recovery input gear 111 and an ASF supply input gear 112 are provided on both sides of the second planetary gear 110. The recovery input gear 111 is rotatably provided so as to meshed with the recording-head recovery unit 106 shown in FIG. 12B. The ASF supply input gear 112 is rotatably provided on a right side plate of the ASF base 80 so as to be meshed with the supply roller 81. As will be described later, when the feeding roller 10 is in an open state, the second pendulum arm 109 is turnable relative to the second sun gear 108. When the feeding roller 10 rotates forward (counterclockwise in FIG. 26A), the second planetary gear 110 co-rotates with the second sun gear 108, and meshes with the ASF supply input gear 112. Conversely, when the feeding roller 10 rotates in reverse (clockwise in FIG. 26A), the second planetary gear 110 meshes with the recovery input gear 111.

Figure 25B:
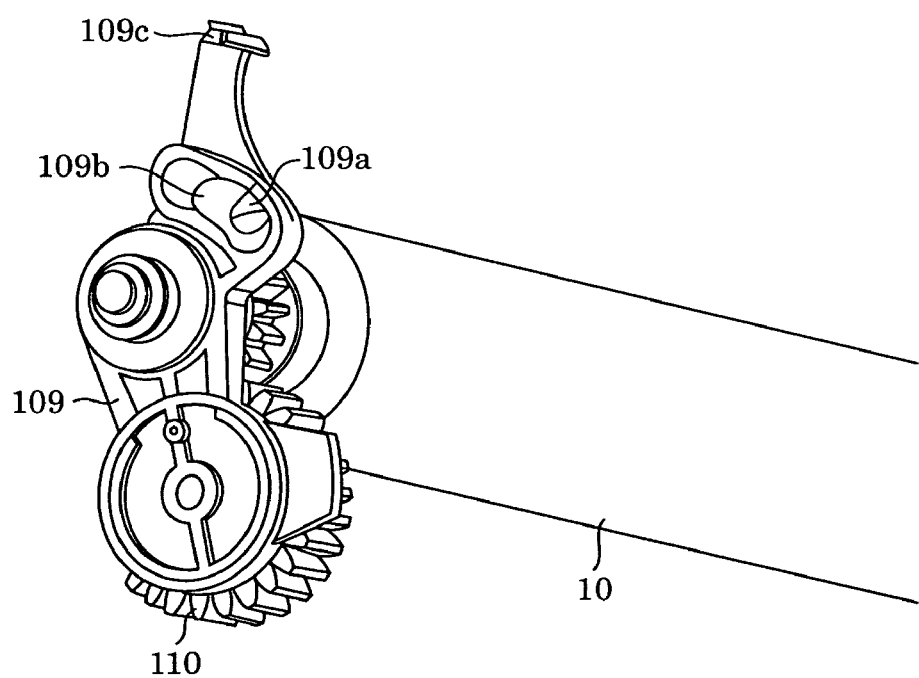

As shown in FIG. 25A, the second pendulum arm 109 has an A-control portion 109c that contacts the carriage 4 to regulate the motion of the second planetary gear 110. A B-control member 114 is provided in the recording-head recovery unit 106 so as to reciprocate parallel to the moving direction of the carriage 4. The B-control member 114 is biased by a flexible member 113 in the direction of arrow d in FIG. 27A, and a boss 114b at its leading end is biased towards the second pendulum arm 109. As shown in FIG. 25B, the second pendulum arm 109 has a circular through hole 109a and a semicircular wall 109b. When the second planetary gear 110 is meshed with neither the recovery input gear 111 nor the supply input gear 112, the boss 114b engages with the circular hole 109a or the semicircular wall 109b to regulate the motion of the second planetary gear 110.

Figure 27A:
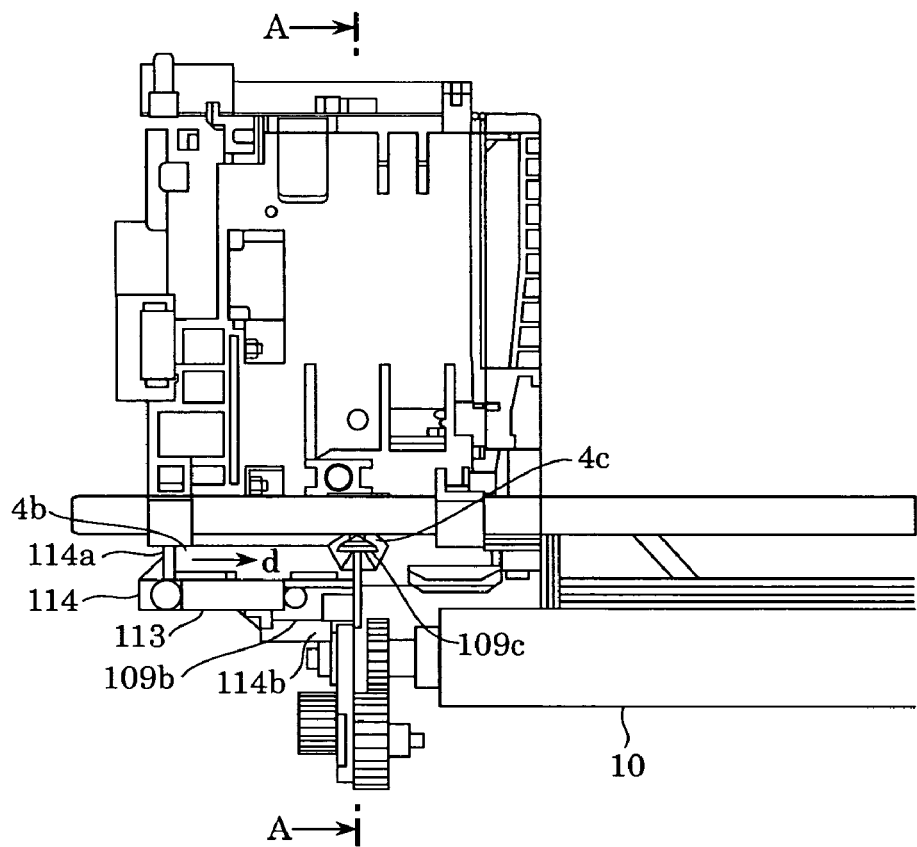
FIGS. 27A and 27B are front views showing the configuration of the second drive switching unit.

As shown in FIG. 25A, a projection 114a of the B-control member 114 is engaged with a wall 4b of the carriage 4. The leading end of the A-control portion 109c of the second pendulum arm 109 is triangular. When the carriage 4 moves to a position such that a cutout 4c thereof engages with the A-control portion 109c (ASF supply position), as shown in FIG. 27A, the boss 114b of the B-control member 114 does not engage with the hole 109a, but is engaged with the semicircular wall 109b by the flexible member 113 that biases the B-control member 114 in the direction of arrow d.

When the feeding roller 10 rotates forward (counterclockwise), as shown in FIG. 26B, the second pendulum arm 109 also rotates until the A-control portion 109c engages with the cutout 4c of the carriage 4, and the second planetary gear 110 meshes with the ASF supply input gear 112. In contrast, when the feeding roller 10 rotates in reverse (clockwise), as shown in FIG. 26C, the second pendulum arm 109 also rotates in reverse, and the second planetary gear 110 separates from the ASF supply input gear 112. In this case, the boss 114b and the semicircular wall 109b are engaged, and therefore, the second pendulum arm 109 does not further follow the reverse rotation of the feeding roller 10, and does not mesh with the second planetary gear 110 and the recovery input gear 111.

Figure 27B:
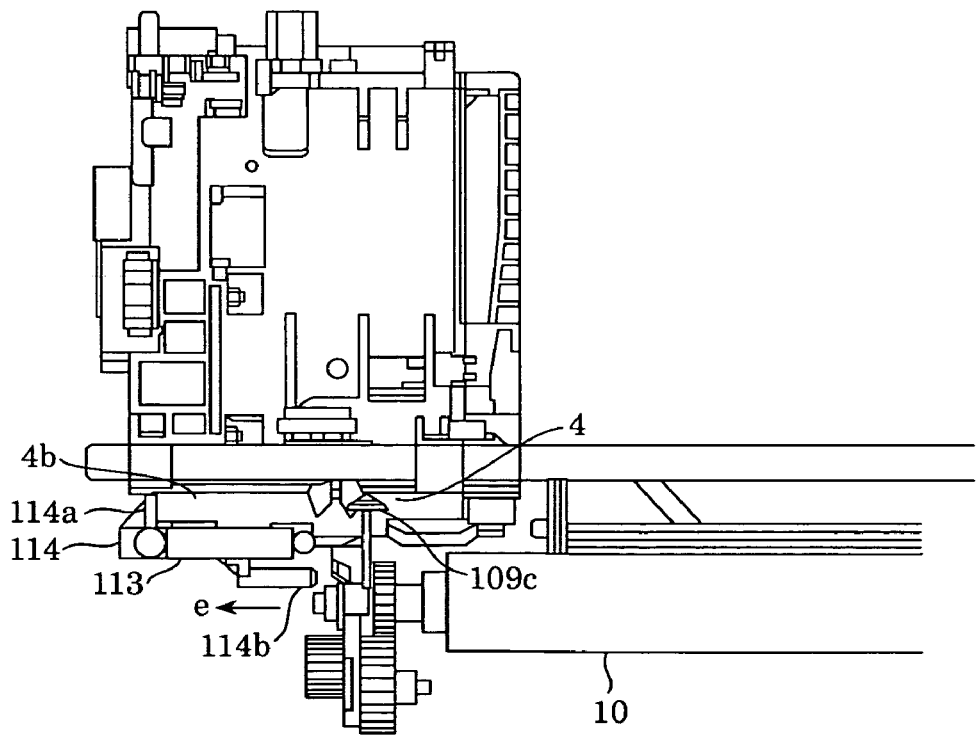

When the carriage 4 is at a capping position (FIG. 12A), the wall 4b thereof pushes the projection 114a of the B-control member 114 in the direction of arrow E against the operating force of the flexible member 113, and the boss 114b of the B-control member 114 is engaged with neither the hole 109a nor the semicircular wall 109b, as shown in FIG. 27B. Therefore, when the feeding roller 10 rotates in reverse (clockwise), as shown in FIG. 26d, the second pendulum arm 109 follows the reverse rotation of the feeding roller 10, and the second planetary gear 110 meshes with the recovery input gear 111. Even when the feeding roller 10 rotates forward (clockwise in FIG. 26A) in this state, since the A-control portion 109c touches the carriage 4, as shown in FIGS. 26A and 27B, the second planetary gear 110 separates from the recovery input gear 111, but the second pendulum arm 109 does not further follow the feeding roller 10, and does not mesh with the second planetary gear 110 and the ASF supply input gear 112.

Figure 28:
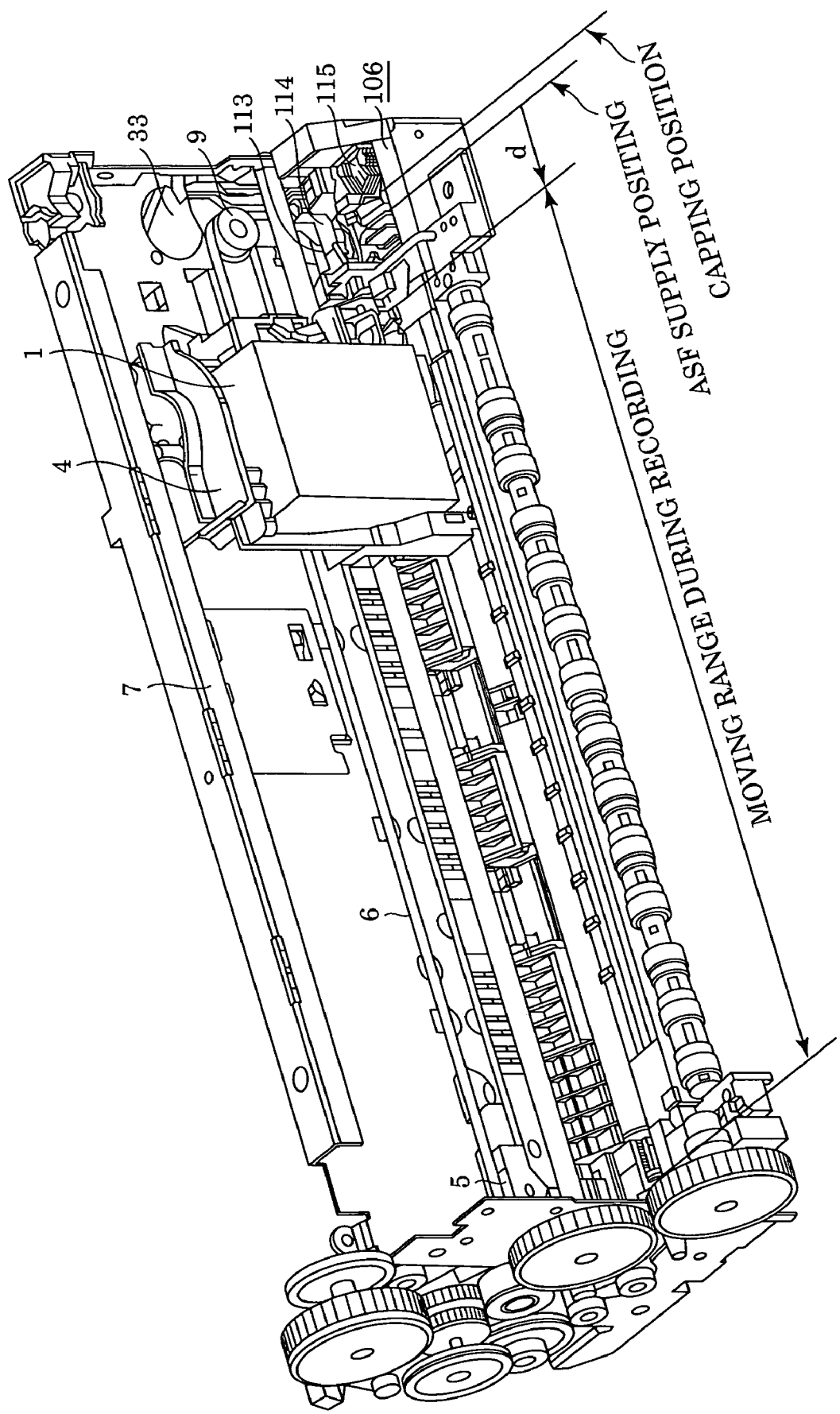
FIG. 28 is a perspective view showing a state in which a carriage is placed at a middle position.

The leading end of the boss 114b of the B-control member 114 is tapered, and the hole 109a and the semicircular wall 109b are shaped like a circular cone. Therefore, when the carriage 4 is placed at a middle position offset from the ASF supply position (offset in the direction of arrow d) within the recording moving range, as shown in FIG. 28, the boss 114b engages with the hole 109a by the action of the flexible member 13 of the B-control member 114 wherever the second pendulum arm 109 of the second drive switching unit 107 is placed. The second drive switching unit 107 is in an idling state. In FIG. 28, the positions are indicated by ink discharging holes of the ink cartridge 1.

FIG. 29 is a control block diagram of the image processing apparatus.

A control board 701 includes a CPU 710 that controls the image processing apparatus and gives various control commands, a ROM 711 that stores control data and so on, and a RAM 712 serving as a region in which, for example, recording data is expanded.

The control board 701 also includes a head driver 713 for driving a recording head 101A, and a plurality of motor drivers 714 for driving a carriage motor 33 and the driving motor 20. An interface 717 transmits and receives data to and from a host apparatus 750 such as a computer or a digital camera.

Document Reading Operation

Figure 30:
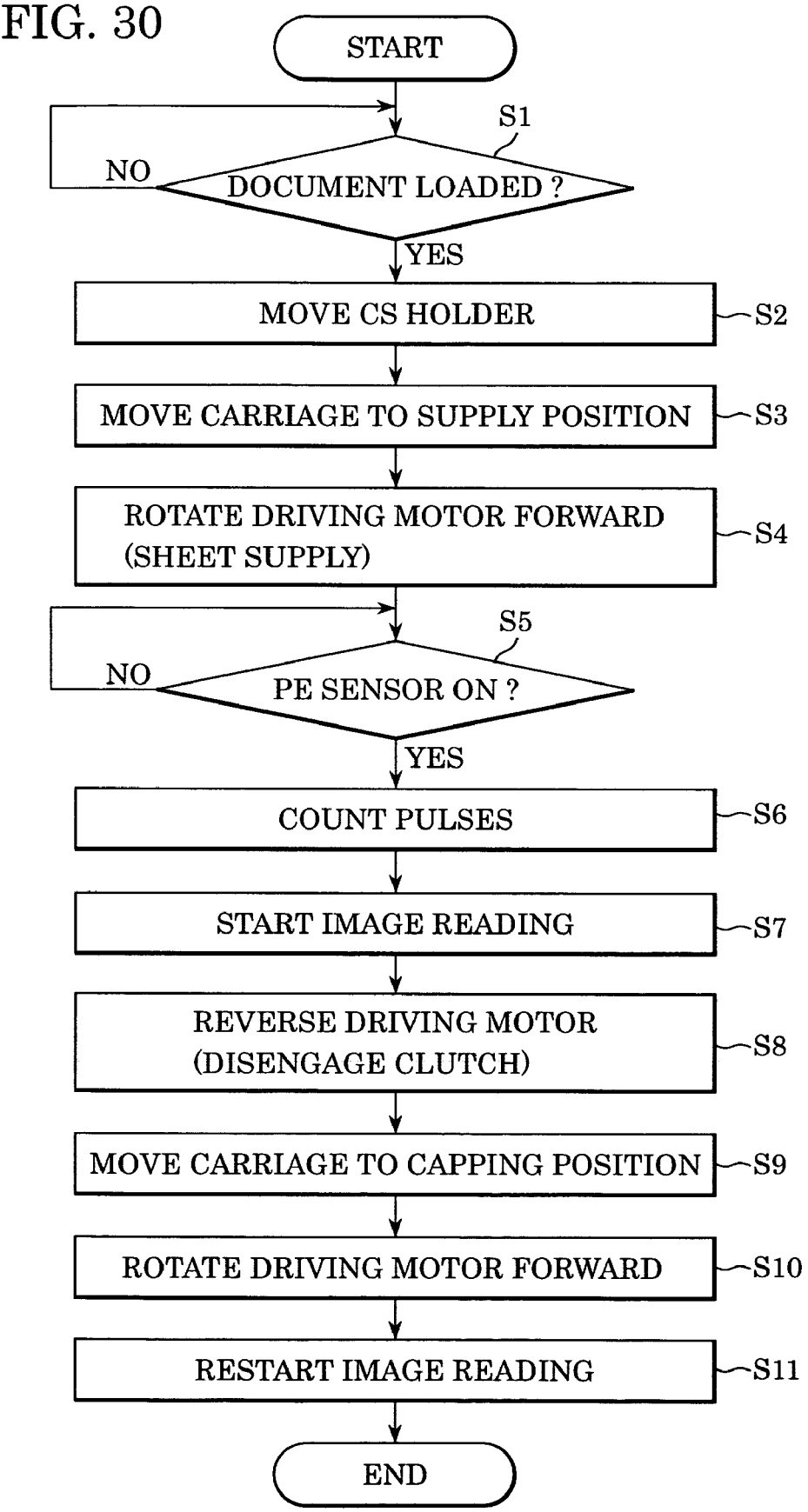
FIG. 30 is a flowchart of a document reading operation of the image processing apparatus.

A description will be given of a document reading operation according to the sequence in which a document sheet is supplied and conveyed, with reference to FIG. 30 as a flowchart.

When document sheets are loaded in the document table 85, they are detected by the DS actuator 92, and the image processing apparatus recognizes the loading of the document sheets (Step S1). When a document reading operation, for example, for copying and data transmission starts, the CS holder 26 having the CS 22 of the image reading unit 28 is held at a reading position by the carriage 4 and the reading driving system, as shown in FIG. 12C (Step S2). Subsequently, a carriage-driving motor (not shown) rotates to move the carriage 4 from a capping position to an ASF supply position (Step S3). Even when the carriage 4 thus moves from the capping position to the ASF supply position, it does not interfere with the image reading unit 28, as shown in FIG. 28.

When the driving motor 20 rotates forward (Step S4), the second planetary gear 110 of the second drive switching unit 107 meshes with the ASF supply input gear 112 (FIG. 26B), as described above, only the uppermost one of the document sheets loaded in the automatic feeding station 103 is separated and supplied to the image reading unit 28. The document sheet is conveyed through a predetermined distance by one turn of the supply roller 81, and the leading edge thereof passes through the nips between the feeding roller 10 and the pinch rollers 16, and reaches a reading position. Since the PE sensor lever 21 for detecting the leading edge of the document sheet is provided immediately before the nips, when the number of rotating pulses of the feeding roller 10 is counted after detection, a reading start portion at which reading of the leading end of the document starts can be exactly grasped through the operation of the feeding roller 10 that will be described later (Steps S5 and 6).

Before one turn of the supply roller 81 is completed, the reading start portion of the document sheet reaches the reading position, and reading of an image on the document sheet is started (Step S7). When one turn of the supply roller 81 is completed during reading (when the linear portion 81c faces the presser plate 82), the feeding roller 10 stops and rotates in reverse (Step S8). The feeding roller 10 is rotated in reverse to a degree such that the reading start portion of the document sheet comes out of the reading position. In this case, the second pendulum arm 109 follows the reverse rotation of the feeding roller 10, and the second planetary gear 110 separates from the ASF supply input gear 112. As a result, the driving transmission path is cut off, and the clutch is disengaged. When the second pendulum arm 109 further turns, the boss 114b of the B-control member 114 engages with the semicircular wall 109b of the second pendulum arm 109. Therefore, the second pendulum arm 109 does not follow the reverse rotation of the feeding roller 10, and is placed in a neutral state such as not to be meshed with the second planetary gear 110 and the recovery input gear 111 (FIG. 26A).

After the carriage 4 is moved from the ASF supply position to the capping position by rotating the carriage-driving motor 33 shown in FIG. 28 (Step S9), the driving motor 20 rotates forward again (Step S10) to rotate the feeding roller 10 forward. The feeding of the document sheet is thereby restarted, and reading is also restarted after the document sheet is conveyed to the previously reading position (Step S11). In this case, the second planetary gear 110 does not mesh with the ASF supply input gear 112 even when the feeding roller 10 rotates forward, as described above. Therefore, the supply roller 81 does not rotate, and the next document sheet is not supplied. After the image on the document sheet is read by the image reading unit 28, the document sheet is ejected toward the front side of the apparatus by the ejection roller 17.

In a case in which the second document sheet is loaded in the automatic feeding station 103 when the rear end of the first document sheet is detected by the PE sensor lever 21, it is detected by the DS actuator 92, and is similarly separated and supplied to be subjected to image reading. When the last document sheet is ejected, since the DS actuator 92 detects no document sheet, the image reading unit 28 is moved to a standby position, and the apparatus is brought into a standby state.

The leading end of the A-control portion 109c of the second pendulum arm 109 is triangular, and an edge of the cutout 4c of the carriage 4 is inclined. In normal cases, after the second planetary gear 110 and the ASF supply input gear 112 are separated by the reverse rotation of the feeding roller 10, the carriage 4 moves from the position at which it is engaged with the A-control portion 109c (ASF supply position). However, even when the carriage 4 is moved by incorrect operation of the apparatus or by the user's intention in a state in which the second planetary gear 110 and the ASF supply input gear 112 are meshed, the second pendulum arm 109 smoothly turns because of the triangular end of the A-control portion 109c and the inclined edge of the cutout 4c. Consequently, the apparatus will not be seriously damaged.

Recording Operation

Figure 31:
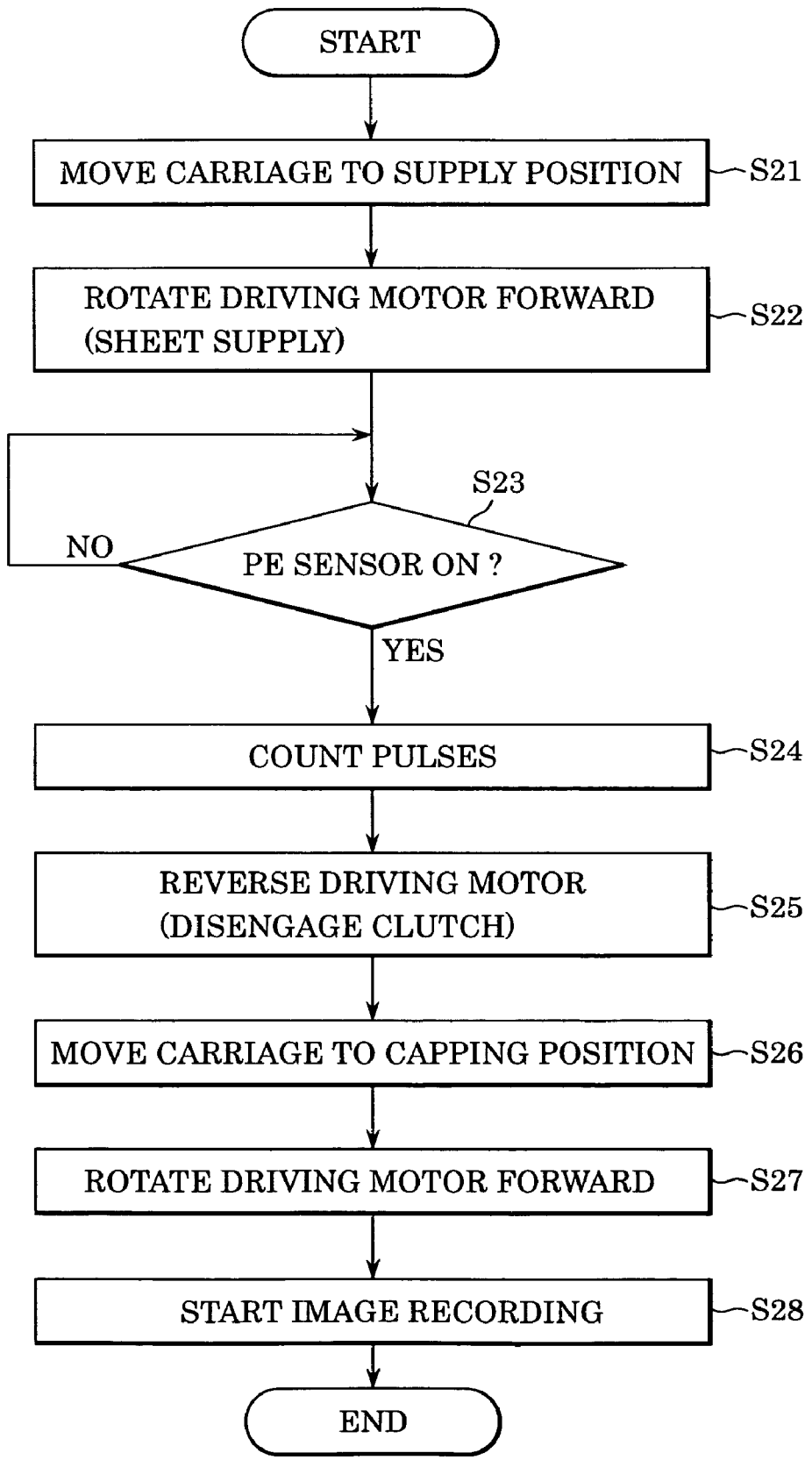
FIG. 31 is a flowchart of a recording operation of the image processing apparatus.
Figure 32:
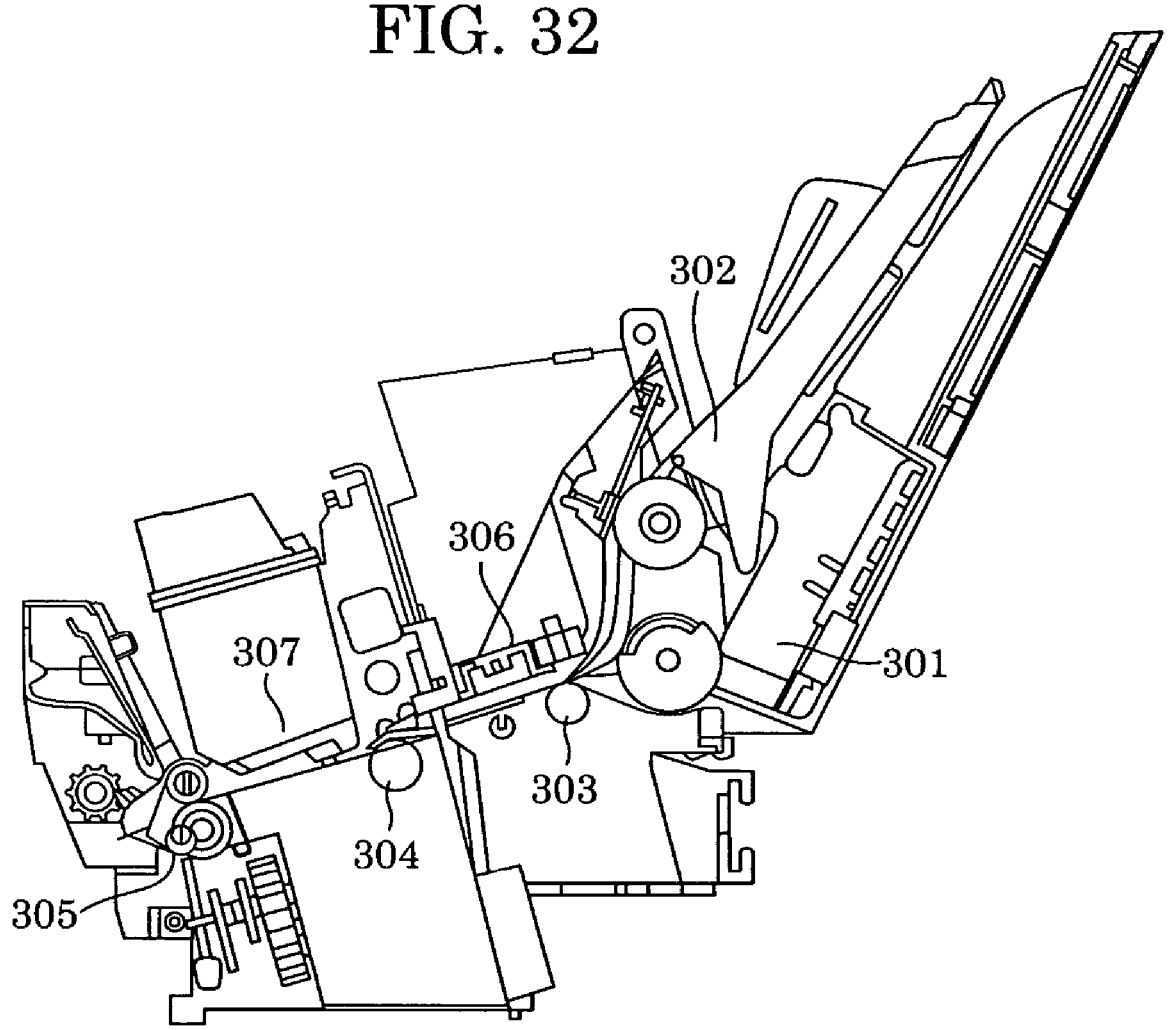
FIG. 32 is a schematic view of a known image processing apparatus.

A recording operation will be described according to the sequence in which a recording sheet is supplied and conveyed, with reference to FIG. 31 as a flowchart.

When the apparatus starts a recording operation for copying or data reception while recording sheets are loaded in the automatic feeding station 103, the carriage-driving motor 33 first rotates to move the carriage 4 from the capping position to the ASF supply position, as described above (Step S21). When the driving motor 20 then rotates, the second planetary gear 110 of the second drive switching unit 107 meshes with the ASF supply input gear 112 (FIG. 26B), only the uppermost one of the recording sheets loaded in the automatic feeding station 103 is separated and supplied to the image recording station 101 (Step S22). The recording sheet is conveyed through a predetermined distance by one turn of the supply roller 81, and the leading edge of the recording sheet passes through the nips between the feeding roller 10 and the pinch rollers 16, and reaches the reading position. Since the PE sensor lever 21 for detecting the leading edge of the recording sheet is provided immediately before the nips, when the number of forward and reverse rotating pulses of the feeding roller 10 is counted after detection, a reading start position at which reading of the leading end of the recording sheet starts can be exactly grasped through the operation of the feeding roller 10 that will be described later (Steps S23 and 24).

When one turn of the supply roller 81 is completed, the feeding roller 10 is stopped, the driving motor 20 is rotated in reverse to return the leading edge of the recording sheet to the recording position (Step S25). Since the recording position is on the downstream side in the feeding direction of the nips between the feeding roller 10 and the pinch rollers 16, the leading edge of the recording sheet does not come out of the nips. In this case, the second pendulum arm 109 follows the reverse rotation of the feeding roller 10, and the second planetary gear 110 separates from the ASF supply input gear 112. When the second pendulum arm 109 further rotates, the boss 114b of the B-control member 114 engages with the semicircular wall 109b of the second pendulum arm 109. Therefore, the second pendulum arm 109 does not follow the reverse rotation of the feeding roller 10, and is placed in a neutral state such as not to be meshed with the second planetary gear 110 and the recovery input gear 111 (FIG. 26A).

After the carriage 4 is moved from the ASF supply position to the capping position by rotating the carriage-driving motor 33 (Step S26), the driving motor 20 is rotated forward again to rotate the feeding roller 10 forward (Step S27). At this time, feeding of the recording sheet is restarted, the carriage-motor driving motor 33 is rotated, and recording is performed by discharging ink from the ink head of the cartridge 1 according to recording commands while moving the carriage 4 laterally, as shown in FIG. 28 (Step S28). In this case, the second planetary gear 110 does not mesh with the ASF supply input gear 112 by the forward rotation of the feeding roller 10, as described in relation to the document reading operation. Therefore, the supply roller 81 does not rotate, and the next recording sheet is not supplied. The recording sheet is ejected toward the front side of the apparatus by the ejection roller 17 after an image is recorded thereon by the image recording station 101.

In order to perform recording on the second and subsequent recording sheets, the recording sheets are separated and supplied by repeating similar operations. When the last recording sheet is ejected, the carriage 4 returns to the capping position, and the apparatus is placed in a standby state.

As described above, the image processing apparatus of the present invention includes the supply roller that supplies a document sheet or a recording sheet from the document loading unit or the recording-sheet loading unit, the separator that separates the document sheet or the recording sheet in cooperation with the supply roller, and the feeding path through which both the document sheet and the recording sheet pass. This allows sharing of the structures of the apparatus, and reduces the size and cost of the apparatus. Since the document sheet and the recording sheet can be supplied by their respective optimal operations, the above advantages can be provided without decreasing the processing efficiency.

In order to convey a recording sheet, a reverse feeding operation of returning the recording sheet is performed to align the leading edge of the recording sheet after separation. When a document sheet is conveyed, a reading operation is started at the time when the document sheet reaches the reading unit even during separation and feeding. Therefore, the leading edge of the recording sheet can be exactly positioned, and the reading time for the document sheet can be reduced.

The image processing apparatus of the present invention further includes the feeding roller disposed downstream from the supply roller in the feeding direction, the driving motor for driving the supply roller and the feeding roller, and the clutch for selectively switching states in which the driving force from the driving motor is transmitted to the supply roller and is not transmitted thereto depending on the forward and reverse rotations of the driving motor. After a document sheet is conveyed and reaches the feeding roller, the driving motor is reversed to break the transmission of the driving force to the supply roller by the clutch. Since the driving motor and the supply roller are commonly used, the cost can be reduced.

A document sheet is supplied from the document loading unit by the supply roller. At the time when the document sheet reaches the reading unit via the feeding roller, a reading operation is started. When the document sheet is conveyed through a predetermined distance, the reading operation is stopped, and the driving motor is also stopped. Then, the driving motor is rotated in reverse to disengage the clutch, and is rotated forward again. When the document sheet is conveyed to the position at which is placed before the reverse rotation, the reading operation is restarted. This also reduces the cost, and shortens the reading time.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-184538 filed Jun. 23, 2004, which is hereby incorporated by reference herein.

What is claimed is:

1. An image processing apparatus comprising:
a document loading unit configured to support a document sheet;
a recording-sheet loading unit configured to support a recording sheet;
a supply roller configured to supply the document sheet from the document loading unit or supply the recording sheet from the recording-sheet loading unit;
a feeding path in which both the document sheet or the recording sheet pass;
a reading unit that reads an image on the document sheet supplied by the supply roller;
a recording unit that records an image on the recording sheet supplied by the supply roller;
a feeding roller provided downstream from the supply roller configured to feed the document sheet or the recording sheet supplied by the supply roller in a sheet feeding direction or a reverse direction opposite to the feeding direction,
a driving motor that drives the supply roller and the feeding roller;
a clutch that switches between a state in which a driving force is transmitted from the driving motor to the supply roller and a state in which the driving force is not transmitted, depending on forward and reverse rotations of the driving motor, wherein the transmission of the driving force to the supply roller by the clutch is cut off by rotating the driving motor in reverse after the document sheet reaches the feeding roller; and
a control unit controlling the reading unit to start a reading operation when the document sheet supplied from the document loading unit by the supply roller reaches the reading unit via the feeding roller, the reading operation and the driving motor are stopped after the document sheet is conveyed through a predetermined distance after the reading operation starts, the driving motor is rotated in reverse to disengage the clutch, and the reading operation is restarted after the document sheet is conveyed, by rotating the driving motor forward, to a position where the document sheet is placed before the reverse rotation of the driving motor, and
the control unit controlling the recording unit to start performing a recording operation after the recording-sheet is separated from the supply roller, and the feeding roller feeds the recording sheet in the reverse direction in order to align the leading edge of the recording sheet before the recording operation starts.

2. The image processing apparatus according to claim 1, further comprising a contact-and-separation unit configured to move the recording-sheet loading unit closer to and away from the supply roller,
wherein the supply roller is rotatably fixed, and
wherein the document loading unit is provided nearer the supply roller than the recording-sheet loading unit, and does not have a support portion near the supply roller.

3. An image processing apparatus comprising:
a document loading unit configured to support a document sheet;
a recording-sheet loading unit configured to support a recording sheet;
a supply roller that supplies the document sheet from the document loading unit and the recording sheet from the recording-sheet loading unit;
a feeding unit provided downstream from the supply roller and configured to feed one of the document sheet and the recording sheet supplied by the supply roller in a sheet feeding direction or a reverse direction opposite to the feeding direction;
a reading unit that reads an image on the document sheet fed by the feeding unit;
a recording unit that records an image on the recording sheet fed by the feeding unit;
a clutch transmitting a driving force to the supply roller and being disengaged by reverse rotation of the feeding unit; and
a controller that controls the feeding unit, the recording unit, and the reading unit so that recording on the recording sheet supplied by the supply roller starts after the clutch is disengaged by the reverse rotation of the feeding unit and so that reading of the document sheet supplied by the supply roller starts before the clutch is disengaged, and restarts after the clutch is disengaged by the reverse rotation,
wherein the reading unit starts performing a reading operation when the document sheet reaches the reading unit during the supply roller contact the document sheet to supply the sheet, and the feeding unit does not feed the document sheet in the reverse direction before the reading operation starts, and
wherein the recording unit starts performing a recording operation after the recording-sheet is separated from the supply roller, and the feeding unit feeds the recording sheet in the reverse direction in order to align the leading edge of the recording sheet before the recording operation starts.

4. The image processing apparatus according to claim 3, further comprising a driving source driving the feeding unit,
wherein the clutch includes a sun gear driven by the driving source, and a planetary gear that revolves around the sun gear while being meshed with the sun gear.

5. The image processing apparatus according to claim 4, further comprising a supply gear that transmits the driving force to the supply roller, wherein the planetary gear is meshed with the supply gear to drive the supply roller when the driving source drives the feeding unit forward.

6. The image processing apparatus according to claim 5, wherein the planetary gear separates from the supply gear when the driving source drives the feeding unit in reverse.

7. The image processing apparatus according to claim 6, further comprising a holding unit that holds the planetary gear at a separate position out of mesh with the supply gear.

8. The image processing apparatus according to claim 7, wherein the recording unit includes a carriage that holds a recording head for discharging ink and that moves in a direction substantially orthogonal to a sheet feeding direction, and the holding unit is brought by the carriage into a state such as not to hold the planetary gear.

9. The image processing apparatus according to claim 7, wherein the recording unit includes a carriage that holds a recording head for discharging ink and that moves in a direction substantially orthogonal to a sheet feeding direction, and wherein the holding unit includes an engaging member that holds the planetary gear at the separate position by engaging with an arm for holding the planetary gear, and the engaging member is disengaged from the arm by being pressed by the carriage.

10. The image processing apparatus according to claim 3, wherein the controller controls the feeding unit to convey a recording start portion of the recording sheet downstream from a recording position at which recording is performed by the recording unit, to rotate in reverse to disengage the clutch, and to convey the recording start position of the recording sheet to the recording position, and controls the recording unit to perform recording on the recording start portion of the recording sheet conveyed to the recording position after the feeding unit rotates in reverse.

11. The image processing apparatus according to claim 3, wherein the controller controls the feeding unit to convey a reading start portion of the document sheet downstream from a reading position at which reading is performed by the reading unit, to rotate in reverse to disengage the clutch, and to convey the reading start portion of the document sheet downstream again, and controls the reading unit to start reading when the document sheet first passes through the reading position, to stop reading when the feeding unit rotates in reverse, and to restart reading when the document sheet is conveyed downstream again.

* * * * *